(12) United States Patent
Stoklosa et al.

(10) Patent No.: US 11,094,236 B1
(45) Date of Patent: Aug. 17, 2021

(54) DYNAMIC MODIFICATION OF DIGITAL SIGNAGE BASED ON DEVICE EDGE ANALYTICS AND ENGAGEMENT

(71) Applicant: Adobe Inc., San Jose, CA (US)

(72) Inventors: James Joseph Stoklosa, Walnut Creek, CA (US); Kalyanaraman Balasubramaniam Krishnan, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/073,960

(22) Filed: Oct. 19, 2020

(51) Int. Cl.
   G09F 27/00 (2006.01)
   G06F 3/14 (2006.01)
   G06F 3/16 (2006.01)
   G06F 3/01 (2006.01)

(52) U.S. Cl.
   CPC ............ *G09F 27/005* (2013.01); *G06F 3/013* (2013.01); *G06F 3/017* (2013.01); *G06F 3/14* (2013.01); *G06F 3/16* (2013.01); *G09F 2027/001* (2013.01)

(58) Field of Classification Search
   CPC ... G09F 27/005; G09F 2027/002; G06F 3/017
   See application file for complete search history.

(56) References Cited

U.S. PATENT DOCUMENTS

2020/0286135 A1* 9/2020 Matayoshi ............ G09F 27/005

OTHER PUBLICATIONS

"Crowd-aware billboards", Nesta Charity Website [retrieved Dec. 1, 2020]. Retrieved from the Internet <https://www.nesta.org.uk/feature/10-predictions-2015/crowd-aware-billboards/>., 2015, 3 pages.
"How Integration Works Between a CMS and Quividi", Quividi Website [retrieved Dec. 1, 2020]. Retrieved from the Internet <https://quividi.com/cms/#explanations>., 2020, 3 pages.
"IntelliVision", IntelliVision Website [retrieved Dec. 8, 2020]. Retrieved from the Internet <https://www.intelli-vision.com/>., 7 pages.
"Motion Segmentation", ScienceDirect [retrieved Dec. 1, 2020]. Retrieved from the Internet <https://www.sciencedirect.com/topics/engineering/motion-segmentation>., 2020, 22 pages.
"Symphony Analytic—Crowd Detection", YouTube Video, uploaded Oct. 1, 2019 by user "SenstarCorp" [retrieved Dec. 8, 2020]. Retrieved from the Internet <https://www.youtube.com/watch?v=3x0UIcJ_eY8&feature=youtu.be>., Oct. 1, 2019, 4 pages.

(Continued)

*Primary Examiner* — Kent W Chang
*Assistant Examiner* — Chayce R Bibbee
(74) *Attorney, Agent, or Firm* — FIG. 1 Patents

(57) ABSTRACT

Techniques and systems are described for dynamic modification of digital signage based on device edge analytics and engagement. For instance, the described techniques enable content output of a signage device to be dynamically modified based on different environmental conditions, such as human behaviors indicating likely interest in an instance and/or type of content. Further, different types of sensor data are utilized to automatically detect such behaviors, such as via sensor mounted to and/or adjacent a signage device.

20 Claims, 15 Drawing Sheets

(56) References Cited

OTHER PUBLICATIONS

Denman, Simon et al., "Identifying Customer Behaviour and Dwell Time using Soft Biometrics", Video Analytics for Business Intelligence [vol. 409: Studies in Computational Intelligence]. Springer-Verlag, Germany [retrieved Dec. 1, 2020]. Retrieved from the Internet <https://eprints.qut.edu.au/50990/1/50990.pdf>., Apr. 5, 2012, 40 pages.

Junior, Julio Cezar S. et al., "Crowd Analysis Using Computer Vision Techniques", In IEEE Signal Processing Magazine, vol. 27, No. 5 [retrieved Dec. 8, 2020]. Retrieved from the Internet <https://www.lume.ufrgs.br/bitstream/handle/10183/27633/000764413.pdf?sequence=1>., Sep. 2010, 12 pages.

Ravnik, Robert et al., "Audience measurement of digital signage: Quantitative study in real-world environment using computer vision", Interacting with Computers, vol. 25, Issue 3 [retrieved Dec. 1, 2020]. Retrieved from the Internet <http://eprints.fri.uni-lj.si/3225/4/FINAL_IWC_2013.pdf>., May 2013, 11 pages.

Ricanek Jr., Karl et al., "What Are Soft Biometrics and How Can They Be Used?", Computer, vol. 44, Issue 9 [retrieved Dec. 1, 2020]. Retrieved from the Internet <https://www.researchgate.net/profile/Karl_Ricanek/publication/220478354_What_Are_Soft_Biometrics_and_How_Can_They_Be_Used/links/0c96052698ecac88b7000000.pdf>., Sep. 12, 2011, 3 pages.

* cited by examiner

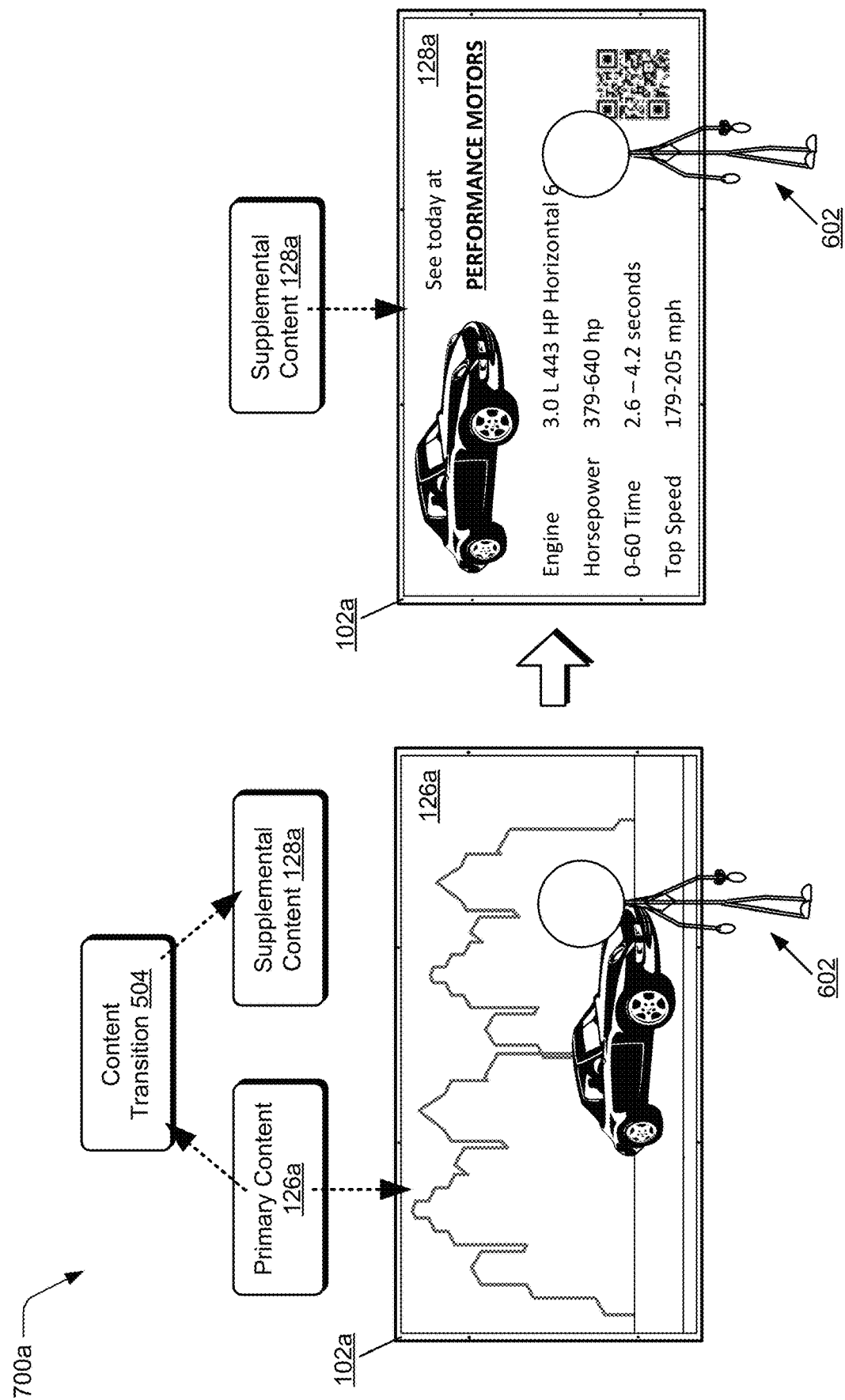

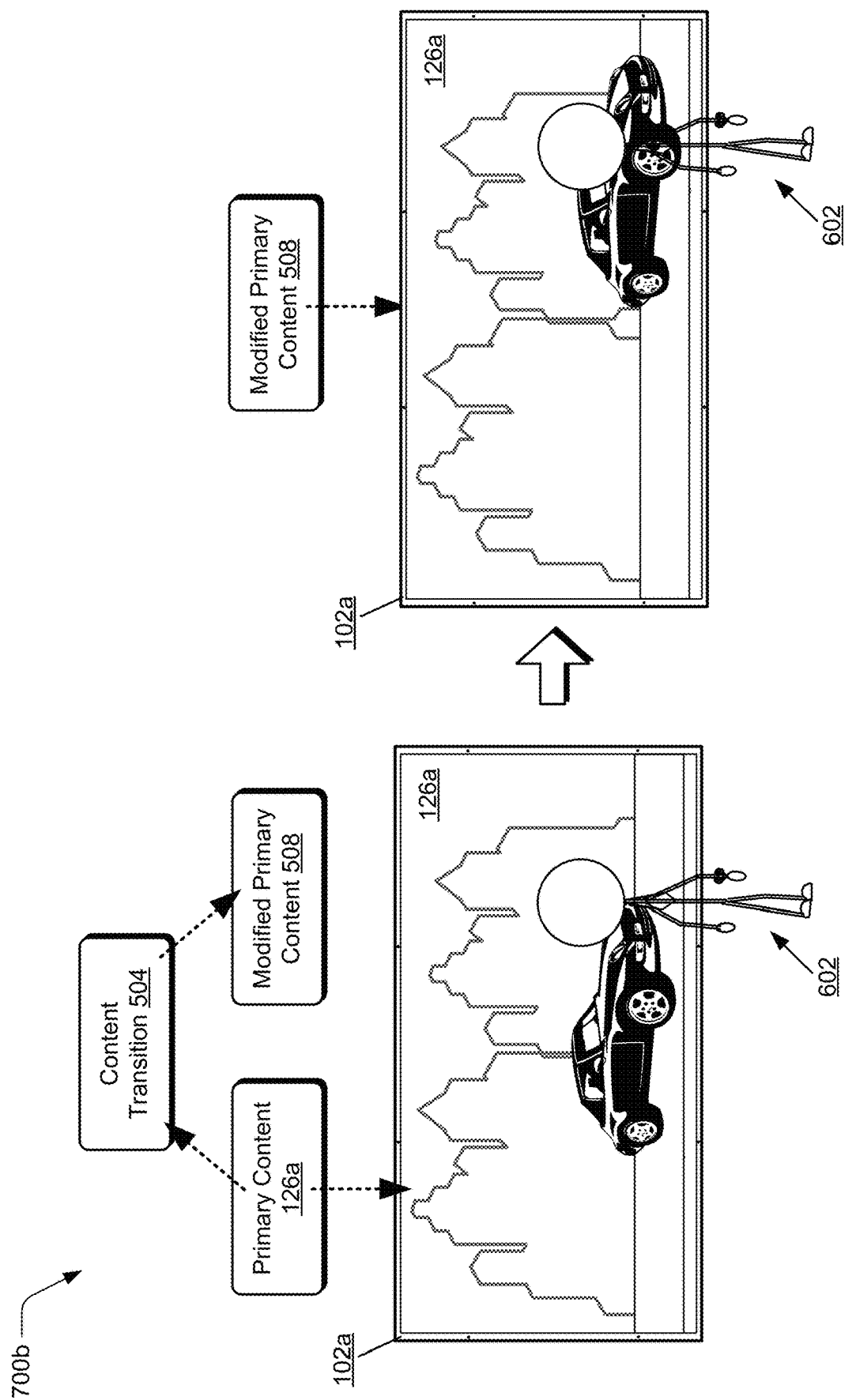

DYNAMIC MODIFICATION OF DIGITAL SIGNAGE BASED ON DEVICE EDGE ANALYTICS AND ENGAGEMENT

BACKGROUND

Digital signage devices are implemented to support a remotely managed display of a variety of digital content by a digital signage management system. As such, digital signage devices are deployed in a diverse range of environments to provide a diverse range of digital content. For example, digital signage devices are found at stadiums, hotels, restaurants, corporate buildings, transportation terminals, physical stores, roadside billboards, and so forth. Further, digital signage devices are configured to provide directions, instructions, advertisements, warnings, and so forth at these different locations using a display of text, static images, animated or video messages, and so on.

Conventional digital signage devices present pre-programmed content based on static publication schedules. For instance, a particular instance of a digital signage device is programmed to present a series of different movie advertisements in sequence, and to transition between advertisements according to a static transition time. The digital signage device, for example, presents a particular movie advertisement for 8 seconds, and then transitions to the next advertisement. This process proceeds in a content loop until content of the digital signage device is manually reconfigured by a content manager. While conventional digital signage devices are able to adapt content output to a limited set of environmental changes (e.g., weather changes), such devices are typically unable to adapt content output to discrete human behaviors, such as how content is output and/or what instances of content are output.

SUMMARY

Techniques and systems are described for dynamic modification of digital signage based on device edge analytics and engagement. For instance, the described techniques enable content output of a signage device to be dynamically modified based on different environmental conditions, such as human behaviors indicating likely interest in an instance and/or type of content. Further, different types of sensor data are utilized to automatically detect such behaviors, such as via sensor mounted to and/or adjacent a signage device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus are referenced interchangeably in single or plural forms of the entities in the discussion.

FIG. 7a depicts an example implementation scenario for implementing a content transition including supplemental content.

FIG. 7b depicts an example implementation scenario for implementing a content transition including modified primary content.

DETAILED DESCRIPTION

Overview

Figure 1:
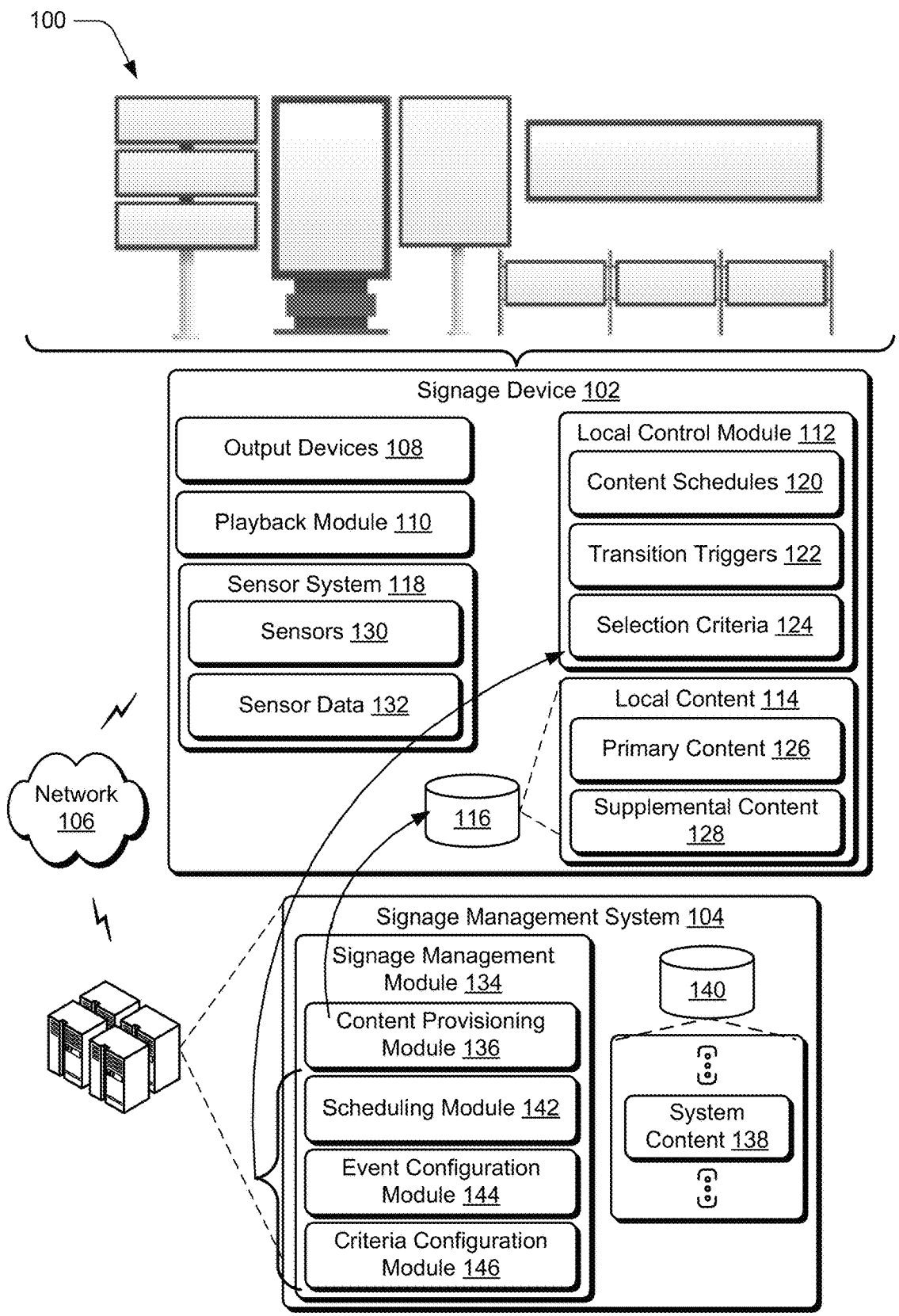
FIG. 1 is an illustration of an environment in an example implementation that is operable to employ dynamic modification of digital signage based on device edge analytics and engagement described herein.

Digital signage devices are utilized in a variety of different environments to deliver a variety of different digital content. Conventional techniques for presenting digital content on a digital signage device typically rely on static content schedules that present different instances of content in a loop and/or series arrangement. Therefore, conventional techniques are typically unable to adapt to changes in a surrounding environment, such as to modify content output based on human behaviors detected in a surrounding environment.

Accordingly, techniques and systems for dynamic modification of digital signage based on device edge analytics and engagement are described. In examples described in the following, a signage device is provisioned with primary digital content ("primary content") for output according to a content schedule, and supplemental digital content ("supplemental content") for output when a content transition trigger occurs and causes a dynamic modification of content output.

Consider, for instance, a scenario in which the signage device outputs a set of primary content, such as in a loop or series and according to a specified content schedule. During output of the primary content, sensors on the signage device collect sensor data (e.g., "edge analytics") based on various detected environmental phenomena, including human behaviors detected in proximity to the signage device. Edge analytics, for instance, refers to detection and analysis of various environmental conditions (e.g., human behaviors)

via various components of the signage device, such as sensors, switches, and connected devices. Examples of human behaviors that are detectable via edge analytics include human motion, gaze direction, gestures, audible speech, and so forth.

At a point during output of the primary content, a human behavior is detected that corresponds to an indication to dynamically modify content output, referred to herein as a "transition trigger." Generally, different human behaviors correspond to a transition trigger, such as a human pausing in front of the signage device (referred to as a "dwell event"), a human gazing and/or gesturing toward the signage device, audible speech (e.g., keywords) detected at the signage device, and so forth. Such human behaviors, for instance, indicate human engagement with content, e.g., indicate human interest in subject matter of the content. For instance, a person slowing and stopping to view primary content is detectable as a dwell event and/or gaze event that indicates human interest in the primary content. As another example, a person gesturing toward the primary content and/or speaking a keyword or key phrase (e.g., "that's cool," "I want that," etc.) also indicates interest in (e.g., engagement with) the primary content.

Accordingly, in response to the transition trigger, a content transition is implemented to transition from output of the primary content based on the content schedule, to output of a modified content stream. The content transition, for instance, represents an exception to the content schedule. Generally, the described techniques include a variety of different options for dynamically modifying a content stream. For instance, in response to a transition trigger, supplemental content is retrieved and output on the signage device, e.g., via a content transition from the primary content being output. Various techniques for retrieval supplemental content are available, such as by subject matter relevance to current primary content, by matching tags between primary content and supplemental content, using demographic data to estimate relevance to a particular person, and combinations thereof.

Alternatively or additionally, output of current primary content is modifiable in response to a transition trigger, such as by modifying a default output duration of the primary content. For instance, consider that a content schedule specifies a default output duration for the primary content, such as 8 seconds. Accordingly, to implement a content transition based on detecting likely human interest in the primary content, the default output duration is extendible beyond the default output duration. For instance, output of the primary content is slowed and/or paused beyond the default output duration, such as to give an observer additional time to consume the primary content. As another example, the output of the primary content is navigated backward to a previous point (e.g., skipped backwards) and playback is resumed to extend an output duration. As yet another example, additional related content (e.g., related supplemental content) is retrieved and inserted into the primary content to provide enhanced primary content. In additional or alternative implementations, content is arrangeable into channels and/or groups based on relevance, and thus channels/groups are available to be output as part of a content transition.

Accordingly, the described techniques enable content output of a signage device to be dynamically modified based on different environmental conditions, such as human behaviors indicating engagement with an instance and/or type of content. Further, different types of sensor data are utilized to automatically detect such behaviors, such as via sensors mounted to and/or adjacent a signage device. Accordingly, the described techniques provide dynamic and automated content modification that greatly reduces manual human interactions required to configure content output to provide content tailored to specific human interests. Further, by utilizing local sensor data and locally provisioned content on a signage device, network communications utilized to adapt content output are reduced and thus device responsiveness to human engagement is increased.

Term Definitions

These term definitions are provided for purposes of example only and are not intended to be construed as limiting on the scope of the claims.

As used herein, the term "signage device" refers to a device with content output (e.g., visual and audible content) and data processing capabilities that is deployable in a variety of different scenarios and environments for output of a variety of different types of digital content.

As used herein, the terms "digital content" and "content" refer to a variety of different types of content stored in an electronic form, such as digital photos captured digitally and/or stored in digital form, analog photos captured and converted into digital form, digital video, digital animations, digital audio, and so forth.

As used herein, the term "primary content" refers to content that is deployed and published based on a specified content schedule. The content schedule, for instance, identifies specific instances of primary content that are to be published according to a set schedule, e.g., time(s) of day, day(s), and so forth.

As used herein, the term "supplemental content" refers to content that is deployed and published in response to a transition trigger. Supplemental content, for instance, is not specifically identified in a content schedule, but is retrieved and published based on a transition trigger that indicates a variance from the content schedule.

As used herein, the term "transition trigger" represents an event that indicates that a variation from a content schedule is to be implemented. Generally, a transition trigger occurs based on various environment conditions, such as sensor data indicating a human behavior that correlates to a transition trigger for transitioning from an output of primary content according to a content schedule to output of content in a form correlated to the human behavior.

As used herein, the term "human engagement" refers to an indication of human behavior extracted from sensor data indicating human interest in content being output. Examples of human engagement include a person pausing and dwelling to view content (a "dwell event"), directing their gaze toward the content, gesturing toward the content, speaking keywords indicating interest in the content, and so forth. Generally, an indication of human engagement is correlated to a transition trigger for dynamically adapting content output.

As used herein, the term "edge analytics" refers to detection and analysis of various environmental conditions via various components of a signage device, such as sensors, switches, and connected devices. Edge analytics, for example, are leveraged to detect human behaviors such as human engagement with content as part of dynamically adapting content output.

In the following discussion, an example environment is first described that employs dynamic modification of digital signage based on device edge analytics and engagement described herein. Example procedures are also described which are able to be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ dynamic modification of digital signage based on device edge analytics and engagement described herein. The illustrated environment 100 includes a digital signage device ("signage device") 102 and a digital signage management system ("signage management system") 104 that are communicatively coupled, one to another, via a network 106, e.g., the Internet. Computing devices that implement the signage device 102 and the signage management system 104 are configurable in a variety of ways, an example of which is detailed below in the discussion of FIG. 14. In at least one implementation, functionality of the signage device 102 and/or the signage management system 104 include operations performed "over the cloud" as further described in relation to FIG. 14. Generally, functionality of the signage management system 104 is able to be implemented remotely over the network 106, and/or in whole or in part locally by the signage device 102.

The signage device 102 includes functionality for enabling dynamic publication of signage content, including output devices 108, a playback module 110, a local control module 112, local content 114 stored on a storage 116, and a sensor system 118. The output devices 108 represent functionality for content output, such as visual display devices, audio output devices, tactile output devices (e.g., haptic devices), and so forth. The playback module 110 represents functionality for controlling content output via the output devices 108. For instance, the playback module 110 represents a media player that is configured to provide various types of digital media output, such as still images, video, audio, haptics, and so forth.

The local control module 112 represents functionality for controlling output of the local content 114 by the playback module 110, such as based on content schedules 120, transition triggers 122, and selection criteria 124. The content schedules 120, for example, identify instances of local content 114 that are to be output via the signage device 102, as well as temporal criteria for output of the local content 114. For a particular instance of local content 114, for example, the content schedules 120 specify time(s) of day that the local content 114 is to be output and duration(s) of output by the signage device 102.

Generally, the local content 114 represents various types of digital content for output by the signage device 102, such as still images, animations, video, audio, websites, and/or combinations thereof. Further, the local content 114 includes primary content 126 and supplemental content 128. In at least one implementation, the content schedules 120 are generated to schedule output of instances of the primary content 126, and the transition triggers 122 represent events that cause transitions from the primary content 126 to the supplemental content 128 and/or modifications in output of the primary content 126. The transition triggers 122, for example, represent data that describes various conditions that cause transitions between different instances of local content 114. As further detailed below, for example, the transition triggers 122 describe different state conditions and/or state changes that cause exceptions to the content schedules 120. For instance, in certain scenarios, the transition triggers 122 override the content schedules 120 and cause dynamic changes in output of local content 114, such as interrupting a transition from one instance of primary content 126 to another instance, to instead present an instance of supplemental content 128. Alternatively or in addition, a transition trigger 122 is interpreted to cause a modification in playback of an instance of primary content 126, such as to modify a playback speed of the primary content 126, to insert supplemental content 128 into the primary content 126, and so forth.

The selection criteria 124 represent criteria that specify different parameters that the local control module 112 utilizes to select local content 114 for publishing. For example, in response to detecting a transition trigger 122, the local control module 112 references the selection criteria 124 to determine how to modify content playback and/or which local content 114 to select for modifying content playback. Examples of the selection criteria 124 are discussed throughout and include time of day, day of the week, location of the signage device 102 (e.g., geographic location), product sales near the location of the signage device 102, and combinations thereof. As further detailed below, the selection criteria 124 are able to evolve over time (e.g., learn) based on different factors, such as various types of feedback received in response to content output modification.

The sensor system 118 is representative of functionality to detect various physical and/or logical phenomena in relation to the signage device 102, such as motion, light, image detection and recognition, time and date, position, location, touch detection, temperature, and so forth. To enable the sensor system 118 to detect such phenomena, the sensor system 118 includes sensors 130 that are configured to generate sensor data 132. Examples of the sensors 130 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 132 represents raw sensor data collected by the sensors 130. Alternatively or in addition, the sensor data 132 represents raw sensor data from the sensors 130 that is processed to generate processed sensor data, such as sensor data from multiple sensors 130 that is combined to provide more complex representations of environmental state than is be provided by a single sensor 130.

Generally, the local control module 112 utilizes the sensor data 132 to implement the transition triggers 122. For instance, certain viewer behaviors detected from the sensor data 132 causes transition triggers 122 that dynamically alter playback of the local content 114, such as to override (e.g., temporarily) the content schedules 120.

The signage management system 104 represents functionality for configuring operation of the signage device 102 and includes a signage management module 134 that is operable to interact with the local control module 112 on the signage device 102. For instance, the signage management module 134 includes a content provisioning module 136 that represents functionality for provisioning system content 138 from a storage 140 of the signage management system 104 to the local content 114 of the signage device 102. The system content 138, for example, is provisioned to the local content 114 in response to different events, such as initial deployment of the signage device 102, based on scheduled provisioning events, dynamically in response to a request for updated local content 114, and so forth. Further, the system content 138 includes instances of both the primary content 126 and the supplemental content 128, and in at least one implementation instances of the system content 138 are tagged as either primary content 126 or supplemental content 128.

The signage management module 134 further includes a scheduling module 142, an event configuration module 144, and a criteria configuration module 146. The scheduling module 142 represents functionality for configuring the content schedules 120. In at least one implementation, a particular instance of the system content 138 includes a particular publication schedule. Accordingly, when the instance of system content is provisioned to the local content 114 (e.g., as primary content 126), the scheduling module 142 provides the publication schedule to be used to configure the content schedules 120 to enable the instance of content to be published by the signage device 102 according to the designated publication schedule.

The event configuration module 144 represents functionality for configuring the transition triggers 122 to enable dynamic adaption of output of the local content 114. A managing user, for instance, interacts with the event configuration module 144 to define and configure the transition triggers 122. Generally, different types of transition triggers 122 are definable, such as human dwell time, human gaze direction, keywords, human gestures, and so forth. Further, transition triggers 122 are definable in the context of specific types of sensor data 132, such as based on types of phenomena detected by the sensors 130. In at least one implementation, the transition triggers 122 are content specific, e.g., a specific type of transition trigger 122 is defined and linked to an instance of primary content 126 and supplemental content 128. Thus, when the transition trigger 122 is detected during output of the primary content 126, a transition to output of the instance of supplemental content 128 is performed.

The criteria configuration module 146 represents functionality for configuring the selection criteria 124. For instance, as part of deployment of the signage device 102, the criteria configuration module 146 is leveraged to specify different selection criteria for modifying content playback by the signage device 102, such as selection criteria to determine whether to initiate playback of supplemental content 128, modify playback of primary content 126, which instances of supplemental content 128 to select, and so forth.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
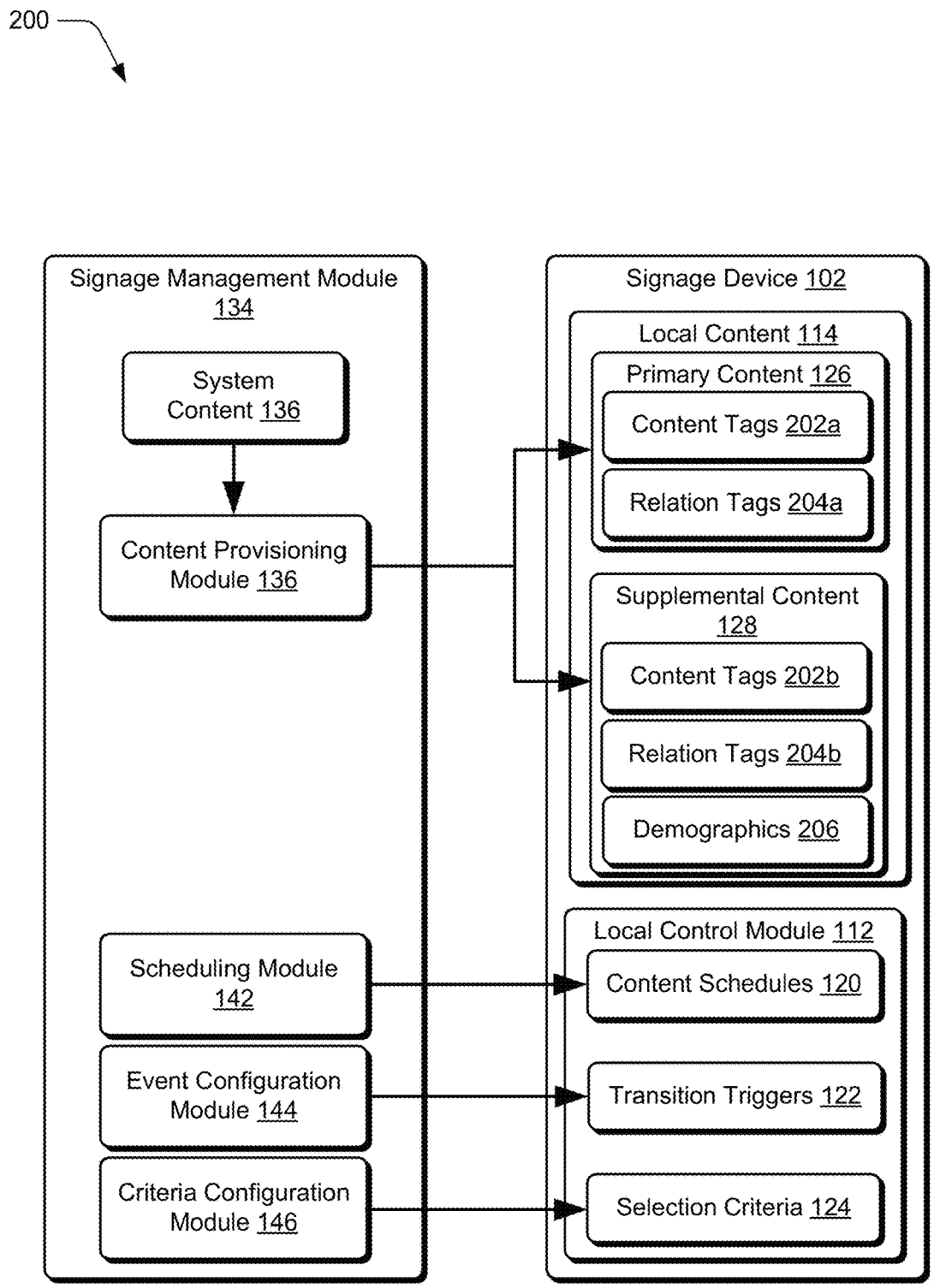
FIG. 2 depicts a system for aggregating content for output by a signage device.
Figure 3:
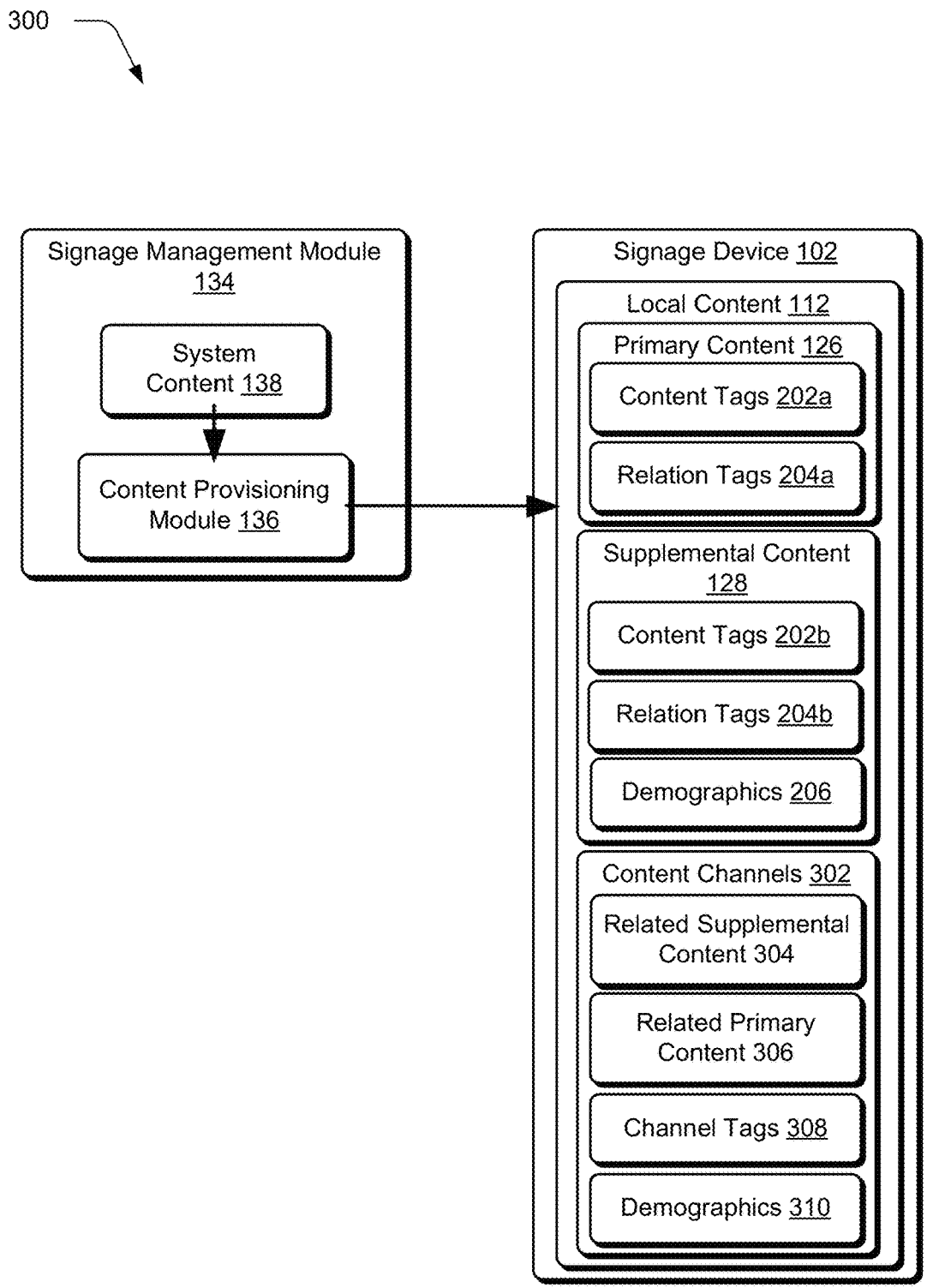
FIG. 3 depicts a system for generating content channels for output by a signage device.
Figure 4:
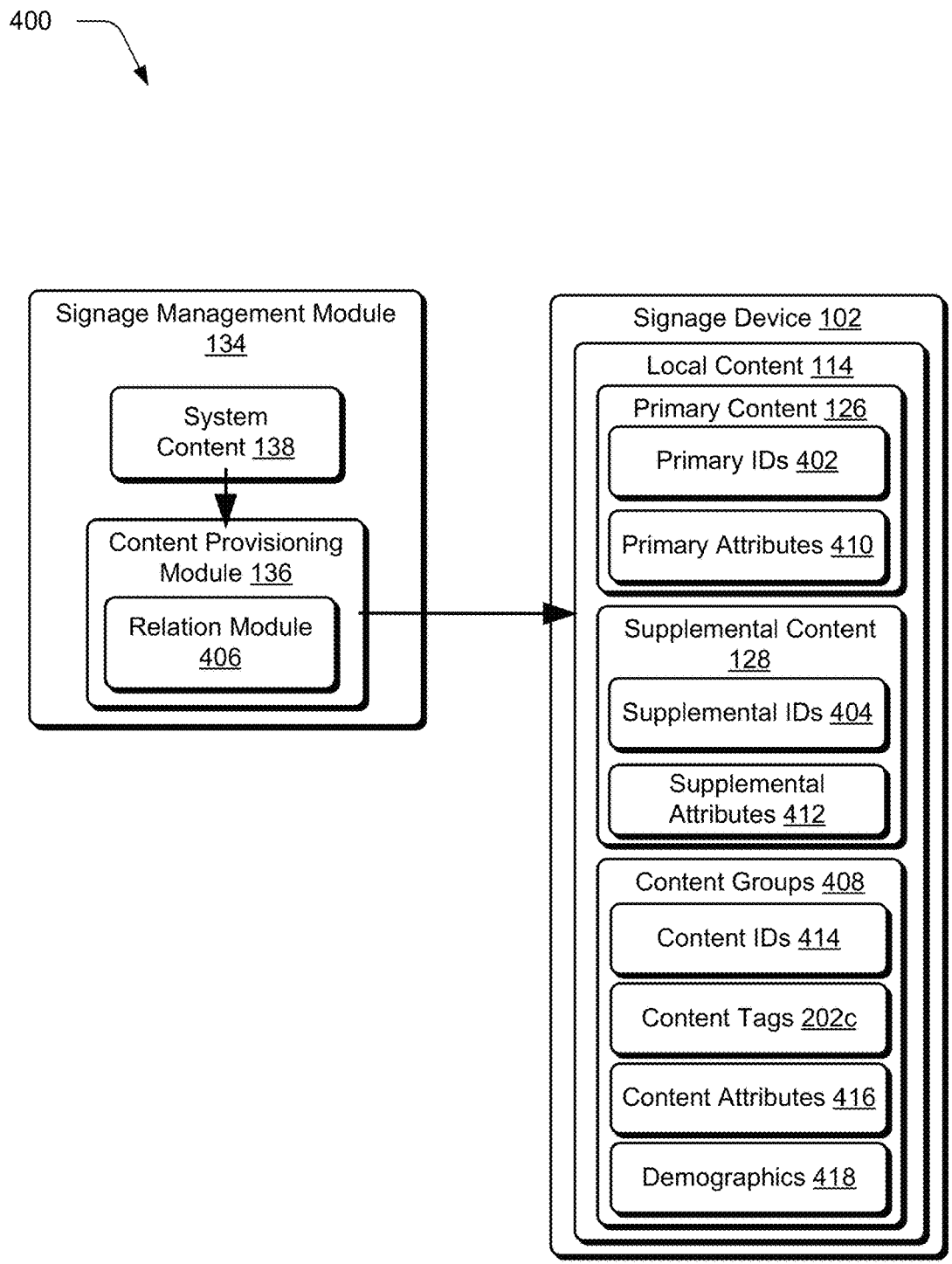
FIG. 4 depicts a system for generating content groups for output by a signage device.

FIGS. 2-4 depict example systems for configuring a signage device to implement techniques for dynamic modification of digital signage based on device edge analytics and engagement in accordance with one or more implementations. Generally, the systems are discussed with reference to data communication between the signage management system 104 and the signage device 102, which is performable over the network 106, via local data communication (e.g., in an implementation where the signage management system 104 and the signage device 102 coexist in an integrated system), and so forth. While the systems are depicted separately, it is to be appreciated that the systems are combinable in different ways to provide for a wide variety of different signage device configuration scenarios.

FIG. 2 depicts a system 200 for aggregating content for output by a signage device. In the system 200, the content provisioning module 136 of the signage management module 134 leverages the system content 138 to provision primary content 126 and supplemental content 128 to the local content 114 of the signage device 102. Further, the primary content 126 includes content tags 202a and relation tags 204a, and the supplemental content 128 includes content tags 202b, relation tags 204b, and soft demographics ("demographics") 206.

Generally, individual instances of the primary content 126 include respective content tags 202a, and the content tags 202a describe attributes of respective instances of primary content 126. For example, for a particular instance of primary content 126, a set of respective content tags 202a identify attributes of the instance of primary content 126. Example attributes described by the content tags 202a include media type (e.g., text, still image, video, animation, audio, etc.), visual objects (e.g., automobile, clothing (e.g., women's clothes, men's clothes, children's clothes, etc.), nature scene, person, animal, device type (e.g., smartphone, tablet, laptop, etc.), and so forth), associated enterprise entities (e.g., product manufacturers, retailers, e-commerce entities, etc.), demographic attributes (e.g., attributes of persons known to be interested in an instance of primary content 126), and so forth.

The relation tags 204a identify instances of supplemental content 128 that are related to instances of the primary content 126. For example, for a particular instance of primary content 126, a respective relation tag 204a (and/or set of relation tags 204a) identifies supplemental content 128 that is related to the instance of primary content 126. Generally, different relationships are usable to define the relation tags 204a, such as relationship to a common entity (e.g., enterprise entity, government entity, education entity, etc.), common media content (e.g., media subject matter), common demographic attributes, common product relationships, and so forth.

The content tags 202b for the supplemental content 128 identify attributes of instances of the supplemental content, examples of which are mentioned above with reference to the content tags 202a. Further, the relation tags 204b identify instances of the primary content 126 that are related to instances of the supplemental content 128. For example, for a particular instance of supplemental content 128, a respective relation tag 204b (and/or set of relation tags 204b) identifies primary content 126 that is related to the instance of supplemental content 128. The demographics 206 represent soft demographic attributes of humans, such as physical, behavioral, and/or or adhered human characteristics. In at least some implementations, the demographics 206 do not identify specific persons (e.g., by name or other personal identifiable information), but identify human attributes according to different human categories. Generally, the demographics 206 are usable to select instances of supplemental content 128 for output, such as based on detected demographic attributes (e.g., soft biometrics) of persons detected in proximity to the signage device 102.

Continuing, the scheduling module 142 defines content schedules 120 for the primary content 126. Generally, the content schedules 120 indicate publication time parameters for specific instances of the primary content 126 and/or publication sequencing for the primary content 126. For instance, the content schedules 120 identify time(s) of day and/or days of the week that instances of the primary content 126 are to be published by the signage device 102. Further, the content schedules 120 specify a presentation period for instances of the primary content 126, e.g., presentation duration that instances of the primary content 126 are to be published before proceeding to a subsequent instance of primary content 126. In at least one implementation, the content schedules 120 indicate a publication sequence for the primary content 126, e.g., an order in which instances of the primary content 126 are to be published by the signage device 102.

The event configuration module 144 configures the transition triggers 122 to specify various events that cause transitions from the primary content 126 to the supplemental content 128, and/or that cause modification of output of the primary content 126. In at least one implementation, the transition triggers 122 are based on sensor events from the sensor system 118, such as sensor data 132 indicating certain human behaviors. Examples of different transition triggers 122 are presented throughout this disclosure.

Further, the criteria configuration module 146 configures the selection criteria 124 to specify different criteria for modification of content playback by the local control module 112, such as criteria for selection of supplemental content 128, for modifying playback of primary content 126, and so forth. In at least some implementations the criteria configuration module 146 periodically and/or dynamically updates its criteria configuration logic, such as based on feedback regarding the selection criteria 124, feedback regarding content output modification by the local control module 112, external events that pertain to the local content 114 (e.g., product sales statistics), and so forth. Thus, after initial configuration and deployment of the signage device 102, in at least one implementation the criteria configuration module 146 subsequently interacts (e.g., periodically and/or dynamically) to reconfigure the selection criteria 124 based on updates to the criteria configuration module 146.

FIG. 3 depicts a system 300 for generating content channels for output by a signage device. In the system 300, the primary content 126 includes the content tags 202a and the relation tags 204a and the supplemental content 128 includes the content tags 202b, the relation tags 204b, and the demographics 206 described above. Further, the content provisioning module 136 is leveraged to generate content channels 302 that aggregate different related instances of content. Each content channel 302, for instance, includes related supplemental content 304, related primary content 306 (optionally), channel tags 308, and demographics 310. The related supplemental content 304, for instance, represents instances of supplemental content 128 that are related to one another, such as based on common content tags 202b and/or relation tags 204b. The content provisioning module 136, for example, evaluates the content tags 202b and/or the relation tags 204b and aggregates collections of related supplemental content 304 that exhibit a threshold number of common tags to generate instances of the content channels 302.

The content channels 302 optionally include the related primary content 306, which represent instances of the primary content 126 that are related based on various attributes. For instance, the content provisioning module 136 evaluates the content tags 202a and/or the relation tags 204a and aggregates collections of related primary content 306 that exhibit a threshold number of common tags to generate instances of the content channels 302.

The channel tags 308 represent tags that are used to link instances of the content channels 302 to instances of the primary content 126. For example, a relation tag 204a for a particular instance of primary content 126 identifies a particular related content channel 302 based on its respective channel tag 308. Thus, the related content channel 302 is retrievable for publication in response to occurrence of a transition trigger 122 in conjunction with output of the particular instance of primary content 126. In at least one implementation the content channels 302 are aggregated as part of provisioning the signage device 102 such that the content channels 302 are immediately retrievable in response to occurrence of a transition trigger 122. The demographics 310 represent demographics attributes of persons that are likely interested in the content channels 302. For instance, individual instances of the content channels 302 are associated with specific sets of demographics 310 that describe demographic features of persons to which the individual content channels 302 are targeted.

FIG. 4 depicts a system 400 for generating content groups for output by a signage device. In the system 400, the primary content 126 includes primary identifiers (IDs) 402 that each identify an instance of primary content 126, and the supplemental content 128 includes supplemental identifiers (IDs) 404 that each identify an instance of supplemental content 128. Further, the content provisioning module 136 leverages a relation module 406 to process the primary content 126 and the supplemental content 128 and generate content groups 408. The relation module 406, for instance, represents a classifier machine learning model and/or other classification algorithm that generates the content groups 408 based on primary content attributes ("primary attributes") 410 of the primary content 126 and supplemental content attributes ("supplemental attributes") 412 of the supplemental content 128. Generally, the primary attributes 410 and the supplemental attributes 412 identify different attributes of respective instances of the primary content 126/supplemental content 128, such as media type, visual objects included in the content, associated enterprise entities, demographic attributes, and so forth. Thus, the relation module 406 clusters instances of the primary content 126 and the supplemental content 128 into the content groups 408 based on common primary attributes 410 and/or supplemental attributes 412.

The content groups 408 include content identifiers (IDs) 414, content tags 202c, content attributes 416, and demographics 418. Generally, the content IDs 414 identify instances of primary content 126 and supplemental content 128 that are grouped into each content group 408, such as by reference to their respective primary IDs 402 and supplemental IDs 404, respectively. The content tags 202c identify different attributes of content in each content group 408, examples of which are mentioned above with reference to the content tags 202a, 202b. Further, the content attributes 416 identify attributes of content in each content group 408, such as with reference to primary attributes 410 and/or supplemental attributes 412 of content in each content group 408. Accordingly, in at least some implementations, when a transition trigger 122 occurs in conjunction with output of an instance of primary content 126, content from a related content group 408 (e.g., supplemental content 128) is retrieved and output. For instance, a content group 408 with a content ID 414 that references the primary ID 402 for the instance of primary content 126 is retrieved for output.

The demographics 418 represent demographics attributes of persons that are likely interested in the content groups 408. For instance, individual instances of the content groups 408 are associated with specific sets of demographics 418 that describe demographics features of persons to which the individual content channels 418 are targeted.

Figure 5:
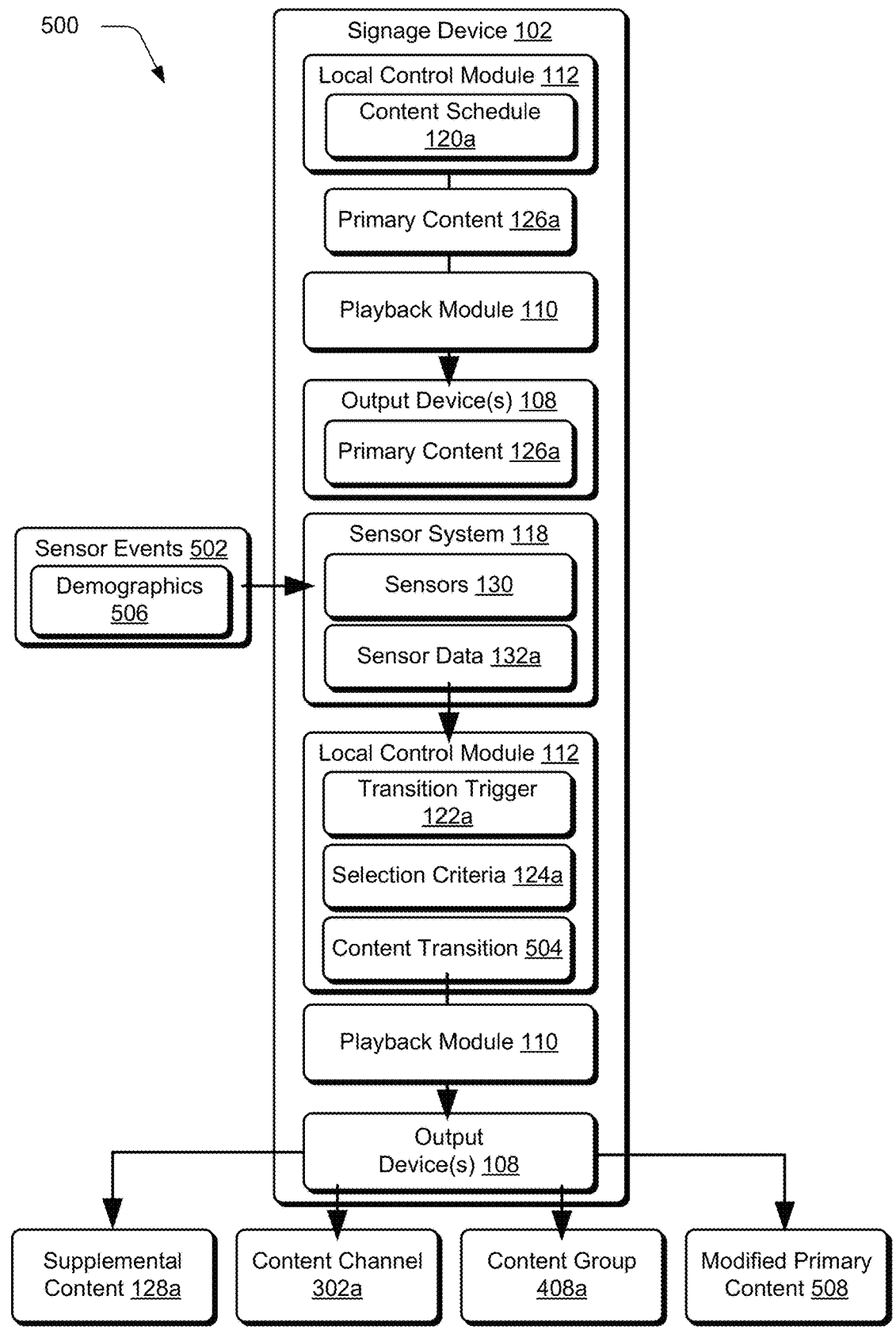
FIG. 5 depicts a system for dynamically adapting content publication based on a transition trigger by a signage device.

FIG. 5 depicts a system 500 for dynamically adapting content publication based on a transition trigger by a signage device. The system 500 includes the signage device 102 in a configured state, such as described with reference to at least one of the systems 200-400. The signage device 102, for instance, has been provisioned with primary content 126, supplemental content 128, content channels 302, and/or content groups 408. In the scenario 500, the local control module 112 instructs the playback module 110 to publish an instance of primary content 126a based on a content schedule 120a. Accordingly, the playback module 110 obtains the primary content 126a from the local content 114 and publishes the primary content 126a via an output device 108. In at least one implementation, the primary content 126a is output as part of a series of content and/or content loop that includes multiple instances of the primary content 126.

In conjunction with (e.g., during) output of the primary content 126a, the sensors 130 of the sensor system 118 collect sensor events 502 relative to the signage device 102 and the sensor system 118 generates sensor data 132a based on the sensor events 502. The sensor events 502, for example, indicate human behaviors detected in proximity to the signage device 102. Thus, in at least one implementation, the sensor data 132a is generated to characterize the human behaviors, such as to indicate human dwell time relative to (e.g., in front of) the signage device 102, human gaze direction relative to the signage device 102, audible words detected, human gestures, and so forth. The local control module 112 receives the sensor data 132a and monitors the sensor data 132a for conditions that correlate to transition triggers 122.

In this particular example, the local control module 112 detects that the sensor data 132a includes data that corresponds to a transition trigger 122a, and thus the local control module 112 determines that based on selection criteria 124a, a content transition 504 is to be implemented. Generally, the content transition 504 indicates that the signage device 102 is to transition from scheduled output according to the content schedule 120a (e.g., after the primary content 126a) to a different publishing scenario. The local control module 112, for instance, configures the content transition 504 based on the selection criteria 124a. The selection criteria 124a, for instance, specify parameters for selecting and outputting content as part of the content transition 504. Generally, the selection criteria 124a are based on various factors, such as the sensor data 132a, time of day, day of the week, content and/or tags included with the primary content 126a, and so forth.

In at least one implementation, the sensor events 502 include demographic data ("demographics") 506, which indicate different human attributes of persons detected by the sensor events 502. Generally, the demographics 506 include physical, behavioral, and/or or adhered human characteristics. "Adhered" human characteristics, for example, represent articles and/or objects detected as attached to a human, such as clothing, a uniform, headwear, shoes, and so forth. In at least some implementations, the demographics 506 do not identify specific persons (e.g., by name or other personal identifiable information), but identify human attributes according to different human categories. Thus, the demographics 506 are applicable to the selection criteria 124a to configure the content transition 504, such as to select content targeted toward a specific human demographic profile determined from the demographics 506.

Examples of the content transition 504 include a transition to output of supplemental content 128, modified primary content 508, a content channel 302, a content group 408, and/or combinations thereof. In at least some implementations, different transition triggers 122 are configured to trigger different content transitions 504.

In the scenario 500, the local control module 112 instructs the playback module 110 to perform the content transition 504, which includes one or more of an output, via the output device(s) 108, of supplemental content 128a, a content channel 302a, a content group 408a, and/or modified primary content 508. For instance, the content transition 504 includes publishing at least one of:

Supplemental content 128a—the content transition 504 causes a transition from output of the primary content 126a to output of the supplemental content 128a. For instance, instead of proceeding from output of the primary content 126a to a subsequent instance of primary content 126 (e.g., as per the content schedules 120), the content transition 504 causes a transition to output of the supplemental content 128a. Generally, the supplemental content 128a is selectable in different ways, such as by matching content tags 202a and/or relation tags 204a of the primary content 126a to corresponding content tags 202b and/or relation tags 204b of the supplemental content 128a.

Content channel 302a—the content transition 504 causes a transition from output of the primary content 126a to output of the content channel 302a. As described previously, for instance, the content channel 302a is linked to the primary content 126a, such as via a channel tag 308.

Content group 408a—the content transition 504 causes a transition from output of the primary content 126a to output of the content group 408a. For example, as described previously, the content group 408a is linked to the primary content 126a, such as via the content tags 202 and/or the content attributes 416.

Modified primary content 508—the content transition 504 causes a modification in output of the primary content 126a to generate and output the modified primary content 508. For instance, the primary content 126a is associated with a default output duration of s seconds, e.g., 8 seconds. However, based on the content transition 504, the default output duration is modified to s+n seconds, where n=an integer such as 3, 4, 5, . . . . Generally, the modified primary content 508 is usable to modify output of the primary content 126a in different ways. For instance, in a scenario where the primary content 126a is a still image, the modified primary content 508 causes output of the still image to extend past a default output duration. As another example, where the primary content 126a involves moving images (e.g., a video and/or animation), the modified primary content 126a causes output of the primary content 126a to be modified such as by pausing the primary content 126a at a final output frame and beyond a default output duration, slowing an output rate (e.g., decreasing output framerate), skipping backward in the primary content 126a from a current playback point to a previous playback point, and so forth. As yet another example wherein the primary content 126a includes audio content, the modified primary content 126a includes slowing output speed of the audio content, replaying the audio content, skipping backward in the audio content, and so forth.

Accordingly, the content transition 504 is able to provide for a variety of different content transition scenarios. In at least one implementation, the content transition 504 includes an instance of the different content transitions described above, and/or combines instances of the content transitions 504, such as by sequencing different instances of the content transitions 504. Further, the system 500 is operable to return to the content schedule 120a after output of the content transition 504 is finished.

Figure 6:
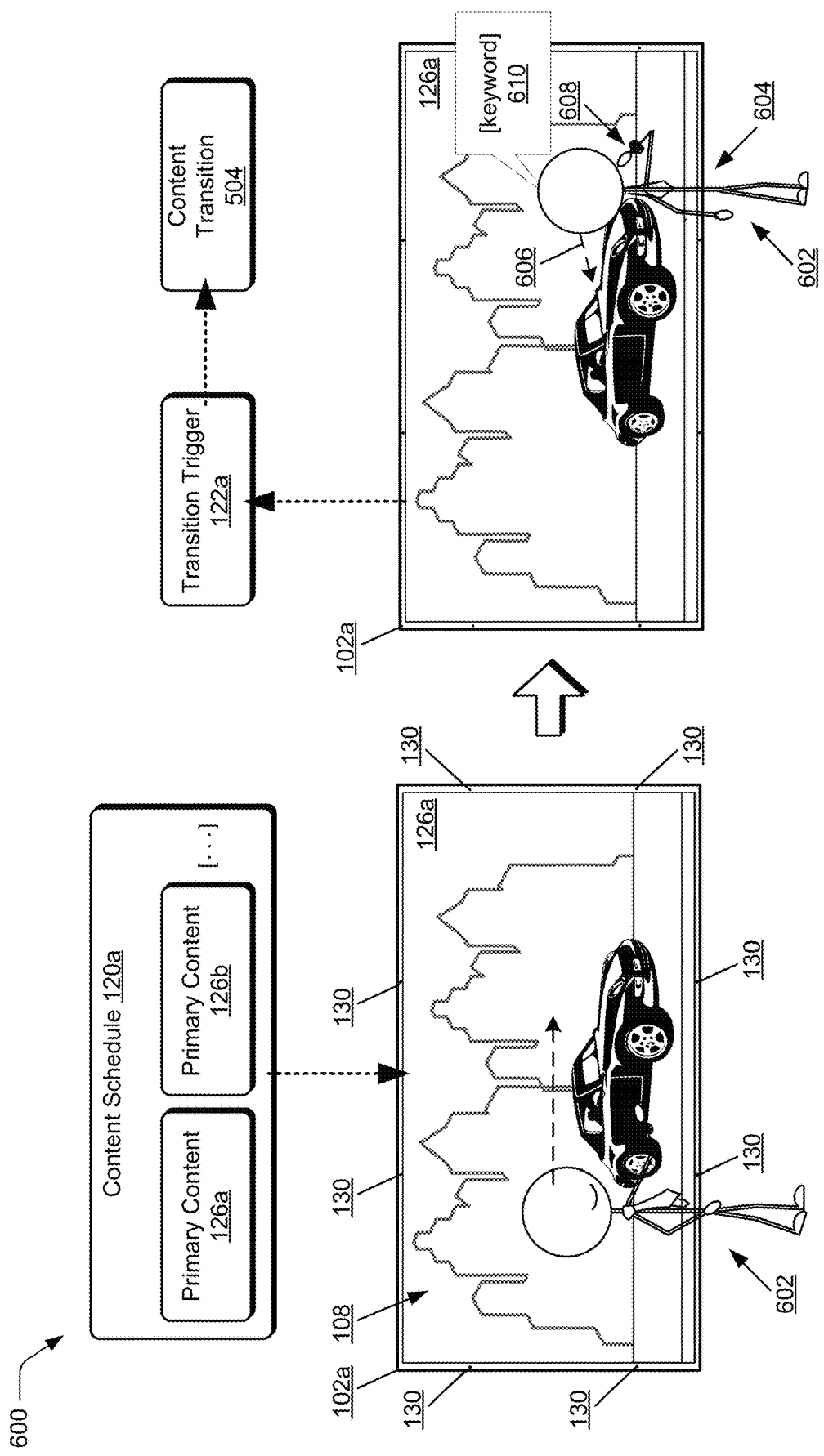
FIG. 6 depicts an example implementation scenario for initiating a content transition.

FIG. 6 depicts an example implementation scenario 600 for initiating a content transition in accordance with one or more implementations. The scenario 600 includes a signage device 102a displaying the primary content 126a on an output device 108, such as according to the content schedule 120a. Further, the signage device 102a includes sensors 130 positioned at different positions relative to the signage device 102. While the sensors 130 are depicted as being installed within the signage device 102, it is to be appreciated that at least one implementation utilizes external sensors 130 that are not physically affixed to the signage device 102a but that are able to communicate sensor data 132 to the signage device 102a, such as via wireless communication. For clarity of illustration, the sensors 130 are not specifically labeled in the subsequent discussion.

In the left portion, the scenario 600 further depicts a person 602 in motion in front of the signage device 102a. The person 602, for example, is walking parallel to the signage device 102. Further, the content schedule 120a indicates that an instance of primary content 126b is scheduled to be published after the primary content 126a. Generally, the sensors 130 are capturing sensor events from a surrounding environment, such as motion, pose information, gaze information, and so forth, of the person 602.

Proceeding to the right portion of the scenario 600, as the person 602 proceeds left to right the person 602 slows and/or stops their motion relative to the signage device 102. Further, the person 602 directs their gaze toward the signage device 102, e.g., toward the primary content 126a. The sensors 130 capture this change in motion as a motion event 604 and gaze direction as a gaze event 606 and the sensor system 118 generates sensor data 132a that describes this change in motion/gaze direction. Accordingly, the local control module 112 correlates the sensor data 132a to the transition trigger 122a which causes the content transition 504. For instance, instead of transitioning from the primary content 126a to primary content 126b according to the content schedule 126a, the local control module 112 implements the content transition 504 in response to the transition trigger 122a.

Additionally or alternatively to the motion event 604 and the gaze event 606, the sensor data 132a captures a gesture event 608 and/or a keyword event 610, and the local control module 112 implements the transition trigger 122a and the content transition 504 based on the gesture event 608 and/or the keyword event 610.

FIG. 7a depicts an example implementation scenario 700a for implementing a content transition including supplemental content in accordance with one or more implementations. The scenario 700a, for instance, represents a continuation of the scenario 600. In the left portion of the scenario 700a, the local control module 112 implements the content transition 504 to transition from the primary content 126a to the supplemental content 128a. For example, instead of a normally scheduled transition between different instances of primary content 126, the transition trigger 122a initiates the content transition 504 for transitioning from the primary content 126a to the supplemental content 128a. Accordingly, in the right portion of the scenario 700a, the playback module 110 transitions from output of the primary content 126a to output of the supplemental content 128a. In this particular example, the supplemental content 128a includes subject matter that is related to subject matter of the primary content 126a. The supplemental content 128a, for instance, includes details about the primary content 126a. Although not explicitly depicted here, in at least one implementation after output of the supplemental content 128a is complete, the local control module 112 causes a transition from output of the supplemental content 128a to output of a subsequent instance of primary content 126, such as based on the content schedule 120.

While the scenario 700a is depicted with reference to the content transition 504 to output of the supplemental content 128a, it is to be appreciated that additionally or alternatively, the content transition 504 causes a transition to a content channel 302, a content group 408, and/or modified primary content 508.

FIG. 7b depicts an example implementation scenario 700b for implementing a content transition including modified primary content in accordance with one or more implementations. The scenario 700b, for instance, represents a continuation of the scenarios 600 and/or 700a. In the left portion of the scenario 700b, the local control module 112 implements the content transition 504 to transition from the primary content 126a to the modified primary content 508. For example, instead of a normally scheduled transition between different instances of primary content 126, the transition trigger 122a initiates the content transition 504 for transitioning from the primary content 126a to the modified primary content 508. Accordingly, in the right portion of the scenario 700b, the playback module 110 transitions from output of the primary content 126a to output of the modified primary content 508.

In this particular example, the modified primary content 508 represents a modification in output of the primary content 126a. For instance, instead of outputting the primary content 126a according to a normally scheduled output duration specified in the content schedule 120, the content transition 504 specifies that output duration of the primary content 126a is to be modified to generate the modified primary content 508. Generally, local control module 112 is operable to leverage the playback module 110 to output the modified primary content 508 in various ways, such as by pausing output of the primary content 126a, slowing an output rate of the primary content 126a, skipping backward through the primary content 126a (e.g., to a previous playback point), inserting additional content (e.g., related supplemental content 128) into playback of the primary content 126a, and so forth. Although not explicitly depicted here, in at least one implementation after output of the modified primary content 508 is complete, the local control module 112 causes a transition from output of the modified primary content 508 to output of a subsequent instance of primary content 126, such as based on the content schedule 120.

Figure 8:
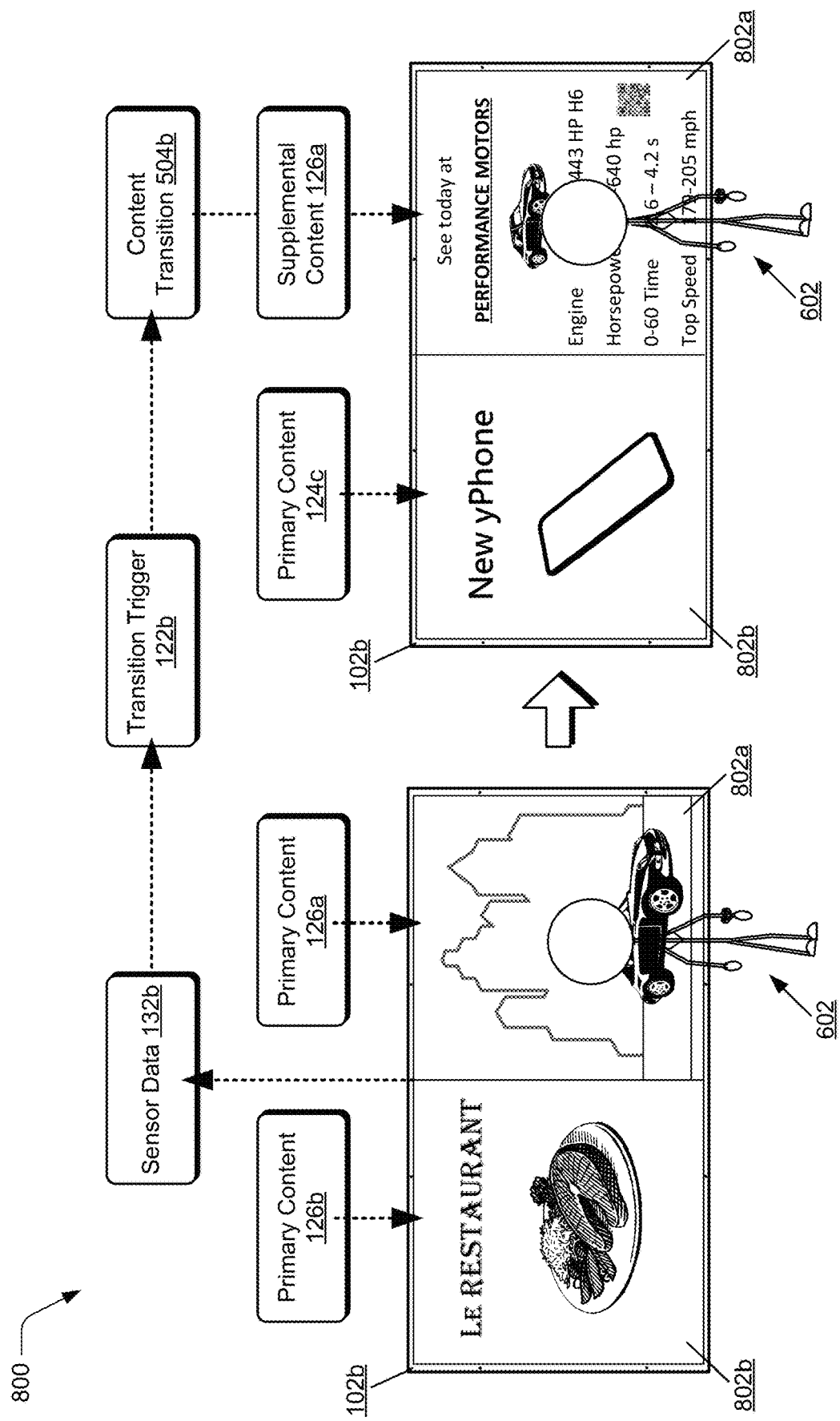
FIG. 8 depicts an example implementation scenario for implementing a content transition relative to multiple instances of primary content.

FIG. 8 depicts an example implementation scenario 800 for implementing a content transition relative to multiple instances of primary content in accordance with one or more implementations. The scenario 800, for instance, represents a variation of and is implementable in conjunction with the scenarios 600, 700. In the scenario 800, a signage device 102b displays the primary content 126a and primary content 126b on an output device 108, such as according to the content schedule 120a. The output device 108, for example, is configured in a split screen scenario where multiple instances of primary content 126 are simultaneously and independently displayed, such as in side-by-side position on the output device 108. Thus, the primary content 126a is output in a region 802a of the output device 108, and the primary content 126b is output in a region 802b of the output device 108.

Further, while the primary content 126a is displayed, the person 602 pauses their motion and directs their gaze toward the signage device 102, e.g., toward the primary content 126a. The sensors 130 capture this change in motion and gaze direction and the sensor system 118 generates sensor data 132b that describes this change in motion/gaze direction. Generally, the sensor data 132b indicates that the person 602 dwells in front of the region 802a and directs their gaze toward the region 802a. The sensors 130, for example, differentiate between different physical regions of the output device 108, and thus the sensor data 132b characterizes human behavior (e.g., dwell time, gaze direction, gestures, and so forth) relative to the different regions 802a, 802b.

Accordingly, the local control module 112 correlates the sensor data 132b to a transition trigger 122b which causes a content transition 504a. For instance, instead of transitioning in the region 802a from the primary content 126a to primary content 126c according to the content schedule 126a, the local control module 112 implements a content transition 504b in response to a transition trigger 122b.

Accordingly, the content transition 504b causes the playback module 110 to transition from outputting the primary content 126a in the region 802a outputting the supplemental content 128a in the region 802a. Further, the playback module 110 transitions from outputting the primary content 126b in the region 802b to outputting primary content 126c in the region 802b. For instance, the content transition 504b causes an exception to the content schedule 120a with respect to the region 802a but the content schedule 120a is utilized to determine primary content 126 to output in the region 802b, e.g., the primary content 126c. Accordingly, implementations described herein are able to differentiate between human behaviors relative to different physical regions of the signage device 102, and to adapt content output on a per-region basis.

In at least one implementation, primary content 126 includes a website that is displayable on a signage device. The scenarios 600-800, for instance, are implementable to control display of a website as the primary content 126 and/or supplemental content 128. Thus, various human behaviors in relation to display of the website are leveraged by the described techniques to control content output in relation to the website. For instance, sensor data based on detection of user dwell time, gaze direction, gestures, speech, and so forth, is usable to replace website-related navigation that traditionally relies on mouse input, touch input, and so forth.

Example Procedures

The following discussion describes procedures that are implementable utilizing the previously described systems and devices. Aspects of the procedures are able to be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-8.

Figure 9:
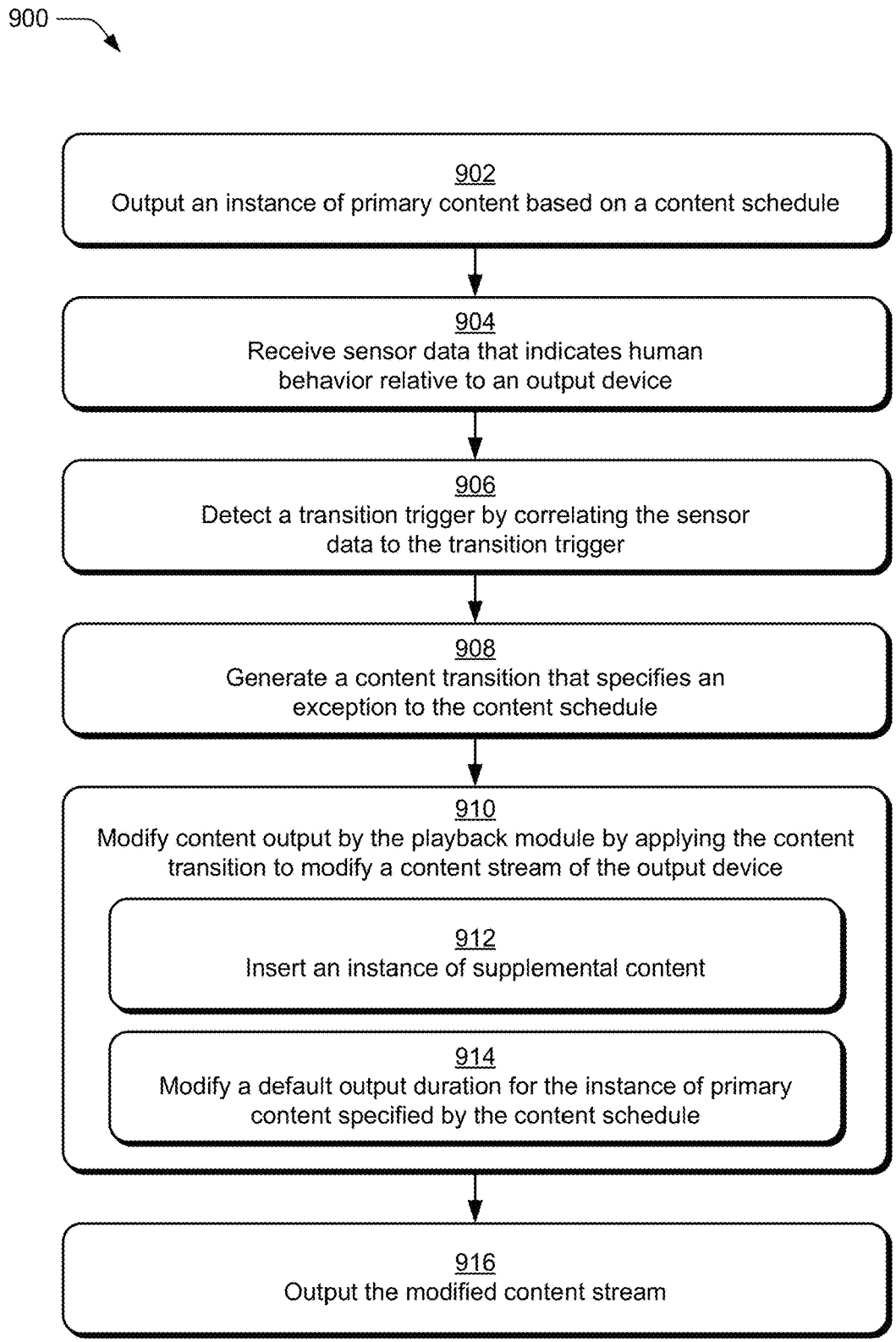
FIG. 9 is a flow diagram depicting a procedure for modifying content output based on sensor data.

FIG. 9 depicts a procedure 900 for modifying content output based on sensor data in accordance with one or more implementations. Step 902 outputs an instance of primary content based on a content schedule. The local control module 112, for instance, utilizes a content schedule 120 to identify instances of primary content 126 for output, and leverages the playback module 110 to output the primary content 126 via the output devices 108.

Step 904 receives sensor data that indicates human behavior relative to an output device. The sensor system 118, for example, leverages the sensors 130 to gather sensor data 132 in proximity to the signage device 102. The sensor data 132, for example, describes attributes of human behavior relative to an output device 108, such as human presence, human motion, human gestures (e g, hand gestures), audible human speech, and so forth.

Step 906 detects a transition trigger by correlating the sensor data to the transition trigger. For instance, the local control module 112 compares the sensor data 132 to the transition triggers 122, such as periodically and/or dynamically in real time and as the sensor data 132 is received. Accordingly, the local control module 112 determines that a particular instance of sensor data 132 correlates to a defined transition trigger 122.

Step 908 generates a content transition that specifies an exception to the content schedule. In response to detecting the transition trigger, for example, the local control module 112 generates data that is implementable to cause a content transition relative to the instance of primary content. Generally, the content transition represents a variation from the content schedules 120. The content transition, for example, overrides (e.g., temporarily) the content schedules 120.

Step 910 modifies content output by the playback module by applying the content transition to modify a content stream of the output device. For instance, the local control module 112 modifies output of the signage device 102, e.g., to vary from the content schedule 120. Generally, the content stream is modifiable in various ways, such as:

Step 912 inserts an instance of supplemental content. For example, instead of a further instance of primary content specified by the content schedule 120, the local control module 112 inserts an instance of supplemental content 128 after a current instance of primary content 126 being output by the signage device 102. Alternatively, the local control module 112 inserts the instance of supplemental content 128 prior to an end point of the current instance of primary content 126, e.g., the local control module 112 specifies that playback of the primary content 126 is to terminate early and playback of the instance of supplemental content 128 is to be initiated.

Generally, an instance of supplemental content 128 is selectable in different ways, such as by matching tags between primary content and supplemental content, matching content types between primary content and supplemental content, locating a content channel 302 that correlates to a current instance of primary content, and so forth. Further, the instance of supplemental content 128 is identifiable prior to occurrence of a transition trigger 122 and/or dynamically after the transition trigger 122 is detected.

Step 914 modifies a default output duration for the instance of primary content specified by the content schedule. For example, alternatively or additionally to inserting supplemental content 128, the local control module 112 modifies a default output duration of the instance of primary content 126. Consider, for instance, that the supplemental content 128 is specified in the content schedule 120 as having a default output time of n seconds. Accordingly, the local control module 112 extends n by an amount of time, e.g., n+i.

Generally, a default output duration of primary content 126 is extendible in different ways. For instance, where the primary content 126 is a static image, a default image display time is extendible. Where the primary content 126 includes video content, the video content playback is modifiable, such as by slowing a default playback speed, temporarily pausing video playback, skipping backward through the video and reinitiating video playback, and so forth.

Step 916 outputs the modified content stream. The local control module 112, for instance, instructs the playback module 110 to output the modified content stream via the output devices 108, and the playback module 110 leverages the output devices 108 to output the modified content stream.

Figure 10:
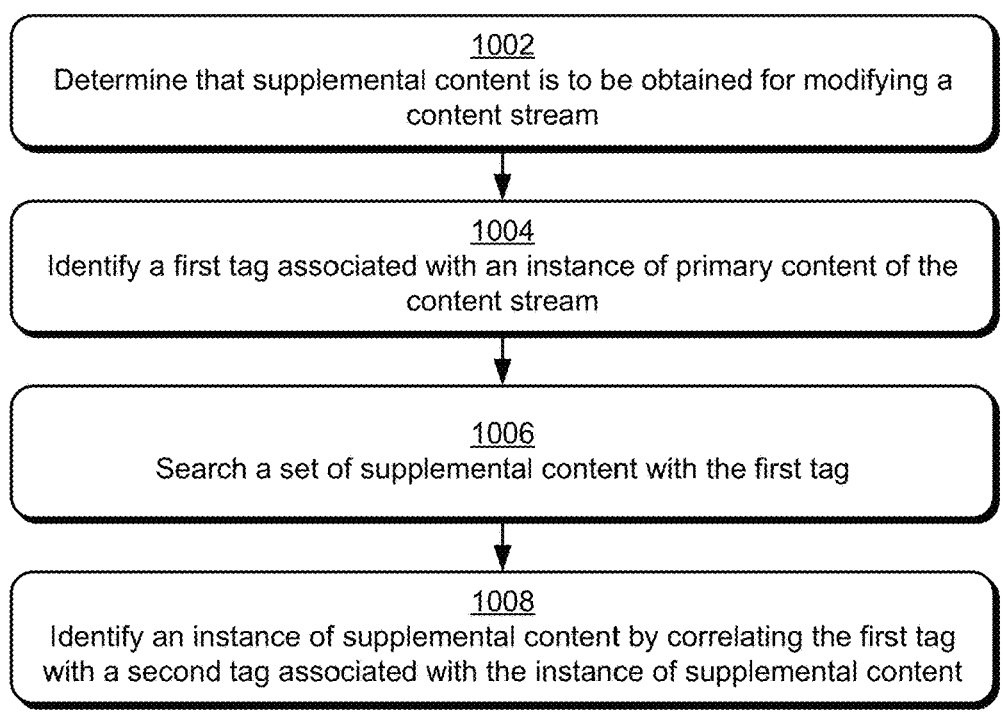
FIG. 10 is a flow diagram depicting a procedure for identifying supplemental content for output.

FIG. 10 depicts a procedure 1000 for identifying supplemental content for output in accordance with one or more implementations. Step 1002 determines that supplemental content is to be obtained for modifying a content stream. For instance, the local control module 112 determines that supplemental content 128 is to be obtained for output in response to detecting a transition trigger 122.

Step 1004 identifies a first tag associated with an instance of primary content of the content stream. The local control module 112, for example, identifies a tag for an instance of primary content that is being output, such as a content tag 202, a relation tag 204, and so forth.

Step 1006 searches a set of supplemental content with the first tag. For example, the local control module 112 searches the supplemental content 128 with the first tag, such as to identify an instance of supplemental content 128 with an identical and/or similar tag.

Step 1008 identifies an instance of supplemental content by correlating the first tag with a second tag associated with the instance of supplemental content. The local control module 112, for instance, locates an instance of supplemental content 128 that includes a tag that is identical or similar to the first tag for the instance of primary content 126. In at least one implementation, a tag similarity threshold is utilized, such as based on a number of common tag keywords. Thus, an instance of supplemental content 128 associated with a tag with the most common keywords to the primary content tag is selectable.

Figure 11:
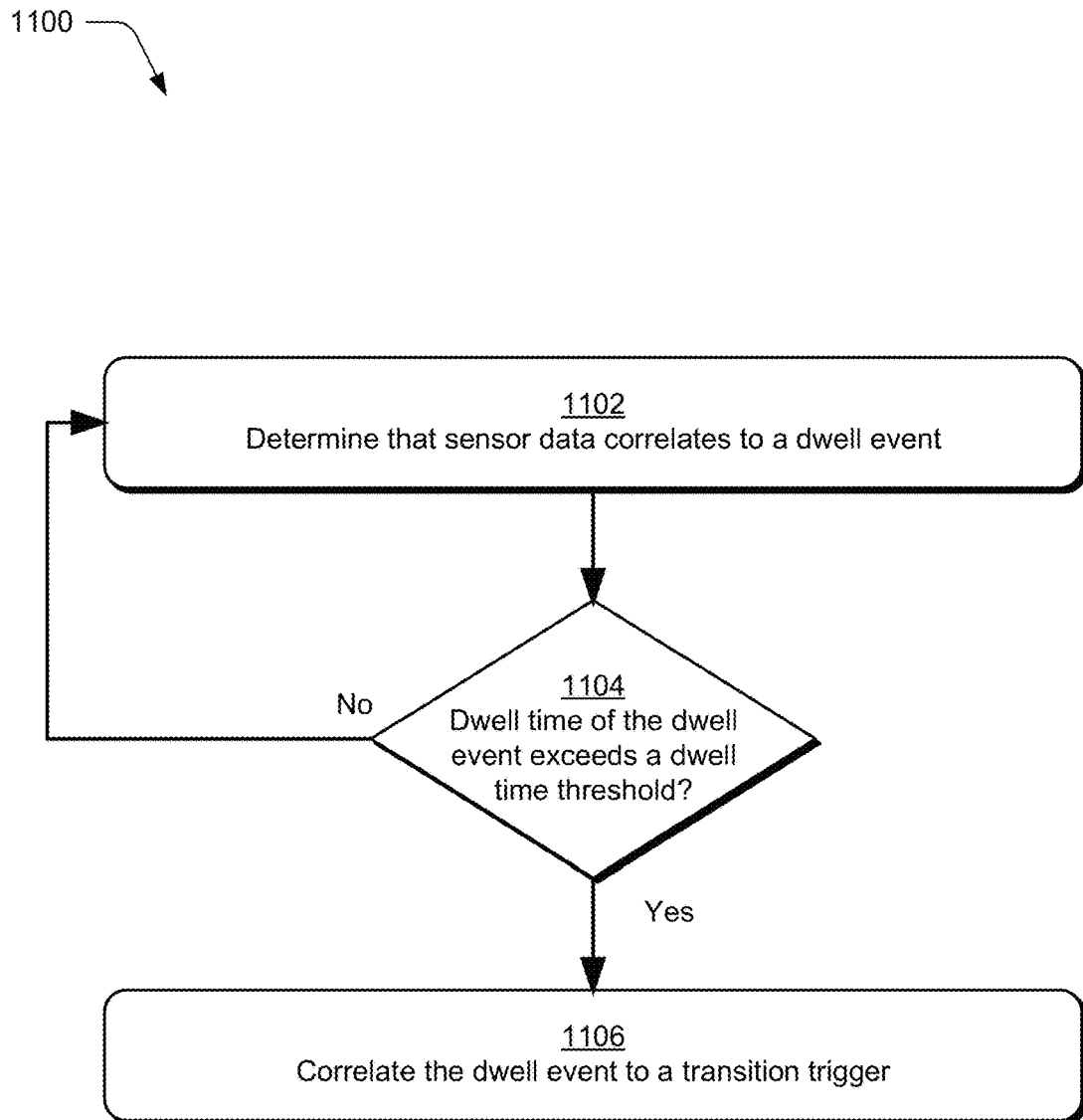
FIG. 11 is a flow diagram depicting a procedure for determining whether a human behavior correlates to a dwell event.

FIG. 11 depicts a procedure 1100 for determining whether a human behavior correlates to a dwell event in accordance with one or more implementations. The procedure 1100, for example, is implemented in conjunction with the procedure 1000 above. Step 1102 determines that sensor data correlates to a dwell event. The local control module 112, for instance, receives sensor data 132 from the sensor system 118 and determines that the sensor data 132 indicates that a human dwells in front of an output device 108. The sensor data 132, for example, indicates a decrease in motion of human detected in front of the signage device 102.

Step 1104 determines whether a dwell time of the dwell event exceeds a dwell time threshold. For example, the local control module 112 is configured with a default dwell time threshold, e.g., d seconds. If the dwell time exceeds the dwell time threshold ("Yes") step 1106 correlates the dwell event to a transition trigger. The local control module 112, for example, determines that the dwell event represents a transition trigger and thus implements a content transition. If the dwell time does not exceed the dwell time threshold ("No"), the process returns to step 1104.

Figure 12:
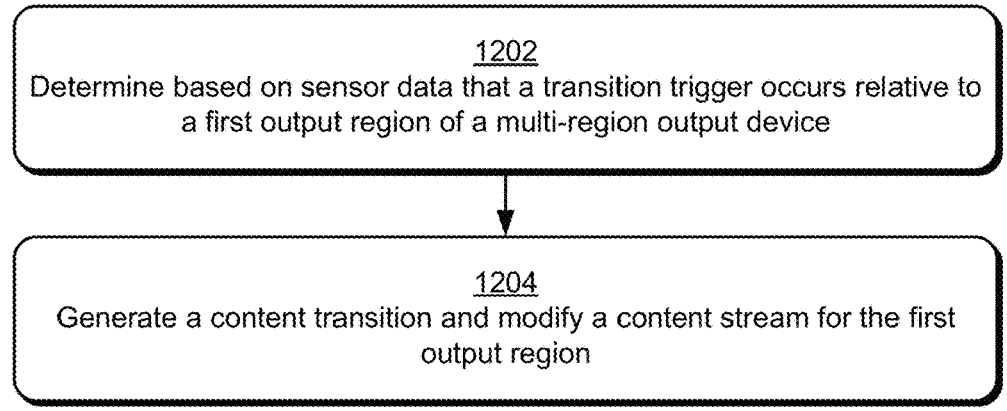
FIG. 12 is a flow diagram depicting a procedure for implementing a content transition in a specific region of an output device.

FIG. 12 depicts a procedure 1200 for implementing a content transition in a specific region of an output device in accordance with one or more implementations. The procedure 1200, for example, is implemented in conjunction with the procedures 1000, 1100 described above. Step 1202 determines based on sensor data that a transition trigger occurs relative to a first output region of a multi-region output device. A particular implementation of an output device 108, for instance, includes multiple different display regions that display different instances of content, e.g., different instances of primary content 126. In at least one implementation, the different display regions are implemented on a single contiguous display surface. Generally, the transition trigger is detectable based on different events relative to the first output region, such as detecting a dwell event adjacent the first output region, a human gaze event and/or a human gesture toward the first output region, an audible keyword detected in proximity to the first output region, and so forth. Thus, the local control module 112 receives sensor data 132 that indicates that the transition trigger occurs relative to the first output region and not other output regions of a multi-region output device 108.

Step 1204 generates a content transition and modifies a content stream for the first output region. The local control module 112, for instance, generates the content transition and applies the content transition to modify a content stream of the first output region, e.g., without affecting content streams of other output regions. Example ways for modifying content streams are presented in detail throughout.

Figure 13:
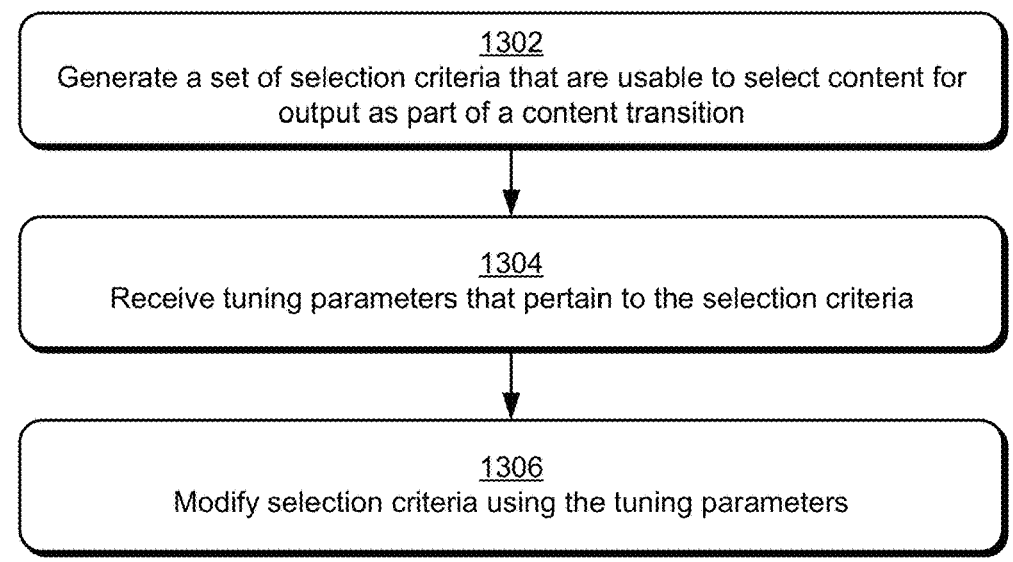
FIG. 13 is a flow diagram depicting a procedure for adapting selection criteria for selection of content according to a content transition.

FIG. 13 depicts a procedure 1300 for adapting selection criteria for selection of content according to a content transition in accordance with one or more implementations. The procedure 1300, for example, is implemented in conjunction with the procedures 1000-1200 described above. Step 1302 generates a set of selection criteria that are usable to select content for output as part of a content transition. The criteria configuration module 144, for example, configures the selection criteria 124 to specify how a content transition is to be implemented, such as based on different sensor data 132, transition triggers 122, demographics, and so forth.

Step 1304 receives tuning parameters that pertain to the selection criteria. Generally, the tuning parameters take a variety of different forms, such as feedback in the form of human behaviors detected in conjunction with content transitions, changes and/or trends in product sales, changes in product availability, new product introductions, seasonal changes (e.g., based on upcoming holidays and/or other calendar events), weather changes and/or patterns, and so forth.

Behavior feedback—generally, behavior feedback seeks to correlate human behaviors with content transitions, such as based on detected human reactions to content transitions. For example, when a content transition is applied to modify content output by a signage device 102, sensor data 132 is collected that characterizes human behaviors that occur temporally in conjunction with (e.g., before, during, and after) the content transition. The sensor data 132, for example, indicates whether a person dwelled in front of the signage device 102 and/or gazed at the signage device after the content transition (positive feedback), or whether the person moved (e.g., walked) away from the signage device, e.g., indicating neutral or negative feedback. Generally, positive feedback is interpreted as an indication that the content transition is favorable, whereas neutral/negative feedback is interpreted as an indication that the content transition was not favorably received. Thus, a tuning parameter is generated based on the feedback. For instance, in response to neutral/negative feedback for a content transition, the tuning parameter indicates that the selection criteria 124 are to be modified to generate a different content transition in response to a similar or identical transition trigger 124.

Product sales—changes and/or trends in product sales are usable to generate tuning parameters for modifying selection criteria. For instance, where a particular content transition involves a particular product and is temporally correlated with an increase in product sales for the product, the content transition is identified as favorable. Thus, a tuning parameter is generated that indicates that the selection criteria 124 are to increase a frequency of implementation of the content transition. As another example, where product sales are observed as decreasing, a tuning parameter is generated that indicates that the selection criteria 124 are to generate additional content transitions that promote the product.

Product availability—changes in product availability are usable to generate tuning parameters for modifying selection criteria. For example, when a new product becomes available and/or will be available in the future, a tuning parameter is generated that modifies selection criteria 124 to select content promoting the new product for incorporation into content transitions. Further, when a product is no longer available, a tuning parameter is generated that modifies selection criteria 124 to remove content promoting the product.

Seasonal and weather changes—generally, some products and information are seasonally relevant, such as products targeted to particular holidays and seasons. Thus, in at least one implementation tuning parameters are generated that modify selection criteria 124 to select content that is seasonally relevant, such as in anticipation of upcoming holidays, seasonal changes, weather changes, and so forth.

Generally, these tuning parameters are presented for purpose of example only, and the described techniques are able to employ a wide variety of different tuning parameters for modification of selection criteria.

Step 1306 modifies selection criteria using the tuning parameters. The criteria configuration module 146, for example, interacts with the local control module 112 to modify the selection criteria 124 using the tuning parameters. For instance, modifying the selection criteria 124 occurs periodically and/or dynamically, such as every t days, dynamically and in response to generating and/or modifying a tuning parameter, and so forth.

In at least one implementation, the criteria configuration module 146 includes and/or leverages a learning algorithm (e.g., a machine learning model) that utilizes various input pertaining to content transitions to predict favorable content transitions, e.g., content transitions that will receive favorable human feedback and/or result in successful product promotions. For example, the criteria configuration module 146 receives training data based on the various tuning parameters described above and uses the training data to train a learning algorithm. The trained learning algorithm then takes various dynamic input (e.g., real-time sensor data 132) to predict favorable content transitions to be applied by the signage device 102.

Accordingly, the techniques described herein enable signage content to be dynamically modified to accommodate a variety of different scenarios.

Example System and Device

Figure 14:
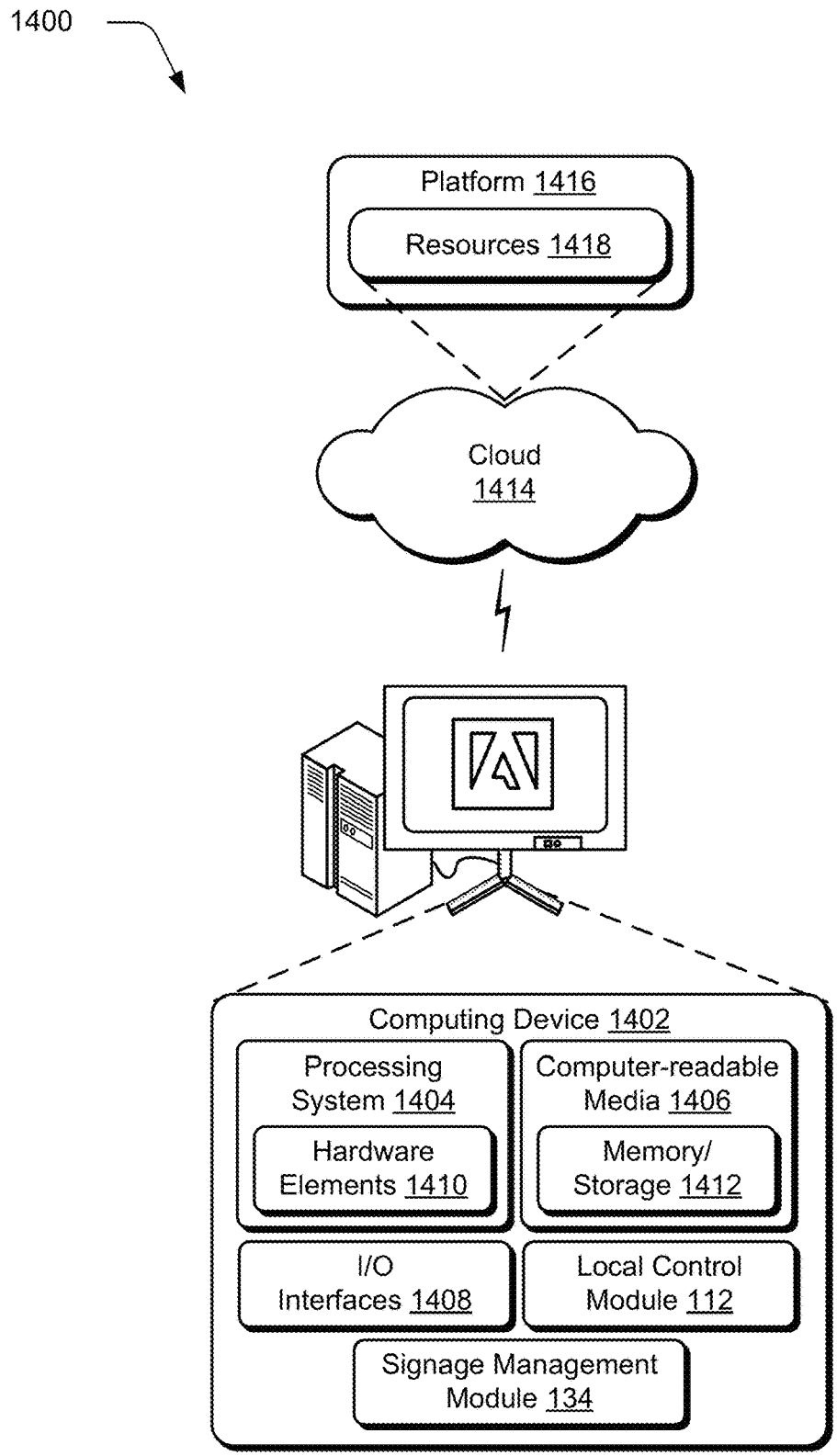
FIG. 14 illustrates an example system including various components of an example device that is implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is demonstrated via inclusion of the local control module 112 and the signage management module 134. The computing device 1402, for example, represents a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that are be configured as processors, functional blocks, and so forth. This includes example implementations in hardware as an application specific integrated circuit or other logic device formed using one or more semiconductors. The hardware elements 1410 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1406 is illustrated as including memory/storage 1412. The memory/storage 1412 represents memory/storage capacity associated with one or more computer-readable media. In one example, the memory/storage component 1412 includes volatile media (such as random access memory (RAM)) and/or nonvolatile media (such as read only memory (ROM), Flash memory, optical disks, magnetic disks, and so forth). In another example, the memory/storage component 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1410. For example, the computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supportable by various configurations of the computing device 1402 and are not limited to the specific examples of the techniques described herein. This functionality is also implementable entirely or partially through use of a distributed system, such as over a "cloud" 1414 as described below.

The cloud 1414 includes and/or is representative of a platform 1416 for resources 1418. The platform 1416 abstracts underlying functionality of hardware (e.g., servers) and software resources of the cloud 1414. For example, the resources 1418 include applications and/or data that are utilized while computer processing is executed on servers that are remote from the computing device 1402. In some examples, the resources 1418 also include services provided over the Internet and/or through a subscriber network, such as a cellular or Wi-Fi network.

The platform 1416 abstracts the resources 1418 and functions to connect the computing device 1402 with other computing devices. In some examples, the platform 1416 also serves to abstract scaling of resources to provide a corresponding level of scale to encountered demand for the resources that are implemented via the platform. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate modified content output based on sensor data, a method implemented by at least one computing device, the method comprising:
   outputting, by a playback module of the at least one computing device, an instance of primary content based on a content schedule specified for the at least one computing device;
   detecting, by a local control module of the at least one computing device, a transition trigger by extracting an indication of human engagement with the instance of primary content from sensor data from a sensor system, and correlating the indication of human engagement with the transition trigger;
   generating, by the local control module of the at least one computing device and in response to the transition trigger, a content transition that specifies an exception to the content schedule; and
modifying, by the local control module of the at least one computing device, content output by the playback module by applying the content transition to perform one or more of:
inserting an instance of supplemental content instead of a further instance of primary content specified by the content schedule; or
modifying a default output duration for the instance of primary content specified by the content schedule.

2. The method as described in claim 1, wherein the content schedule identifies multiple instances of primary content for output in a series and does not specify supplemental content for output.

3. The method as described in claim 1, wherein the indication of human engagement comprises one or more of a human dwell time relative to the at least one computing device or demographic data captured in proximity to the at least one computing device.

4. The method as described in claim 3, wherein the indication of human engagement comprises one or more of a change in motion relative to an output device of the at least one computing device, a gaze direction relative to the output device, a human gesture, or human speech.

5. The method as described in claim 3, wherein the indication of human engagement comprises a dwell time relative to an output device of the at least one computing device, and wherein said detecting the transition trigger comprises:
comparing the dwell time to a dwell time threshold; and
determining that the dwell time exceeds the dwell time threshold.

6. The method as described in claim 1, wherein said generating the content transition is based at least in part on the demographic data without identifying a personal identity of the human.

7. The method as described in claim 1, wherein said inserting an instance of supplemental content after the instance of primary content comprises:
identifying, by the local control module of the at least one computing device, a first tag associated with the instance of primary content;
searching, by the local control module of the at least one computing device, a set of supplemental content with the first tag to identify the instance of supplemental content by correlating the first tag with a second tag associated with the instance of supplemental content.

8. The method as described in claim 1, wherein said inserting an instance of supplemental content after the instance of primary content comprises inserting a content channel for output after the instance of primary content, the content channel including multiple instances of content that are related to the instance of primary content.

9. The method as described in claim 1, wherein said modifying the default output duration for the instance of primary content comprises one or more of slowing a default output speed of the instance of primary content, skipping backward through the instance of primary content, or inserting additional related content into the instance of primary content.

10. In a digital medium environment to modify content output based on sensor data, a system comprising:
a sensor system implemented by at least one computing device to detect a human behavior relative to an output device of the at least one computing device, and generate sensor data that describes the human behavior;
a local control module implemented by the at least one computing device to:
receive the sensor data from the sensor system during output of an instance of primary content by the output device, and correlate the sensor data to an indication of human engagement that correlates to a transition trigger;
generate a content transition that specifies an exception to a content schedule for the instance of primary content; and
modify a content stream for the output device based on the content transition including one or more of to:
insert an instance of supplemental content after the instance of primary content instead of a further instance of primary content specified by the content schedule; or
modify a default output duration for the instance of primary content specified by the content schedule;
a playback module implemented by the at least one computing device to output the modified content stream via the output device.

11. The system as described in claim 10, wherein the sensor data indicates a dwell time of a human relative to the output device, and the local control module is implemented by the at least one computing device to:
correlate the sensor data to the transition trigger based on determining that the dwell time exceeds a dwell time threshold; and
modify the default output duration for the instance of primary content by extending the output duration from the default output duration.

12. The system as described in claim 10, wherein the sensor data indicates a human hand gesture relative to the output device, and the local control module is implemented by the at least one computing device to correlate the human hand gesture to the transition trigger.

13. The system as described in claim 10, wherein the sensor data indicates an audible keyword detected in proximity to the output device, and the local control module is implemented by the at least one computing device to correlate the keyword to the transition trigger.

14. The system as described in claim 10, wherein the output device includes a first output region and a second output region, and wherein the sensor system is further implemented by the at least one computing device to correlate the human behavior to one of the first output region or the second output region.

15. The system as described in claim 14, wherein:
the instance of primary content is output on the first output region and a different instance of content is output in the second region; and
the local control module is implemented by the at least one computing device to:
determine based on the sensor data that the transition trigger occurs relative to the first output region; and
generate the content transition and modify the content stream for the first output region.

16. The system as described in claim 10, wherein the local control module is implemented by the at least one computing device to insert an instance of supplemental content after the instance of primary content by implementing the at least one computing device to:
identify a first tag associated with the instance of primary content; and
search a set of supplemental content with the first tag to identify the instance of supplemental content by correlating the first tag with a second tag associated with the instance of supplemental content.

17. The system as described in claim 16, wherein the sensor data includes demographic data for a human, and wherein the local control module is implemented by the at least one computing device to search the set of supplemental content with the first tag and with the demographic data to identify the instance of supplemental content.

18. A system for generating modified content output based on sensor data, the system comprising:

means implemented by at least one computing device for outputting an instance of primary content based on a content schedule specified for the at least one computing device;

means implemented by at least one computing device for detecting a transition trigger by extracting an indication of human engagement with the instance of primary content from sensor data from a sensor system, and correlating the indication of human engagement with the transition trigger;

means implemented by at least one computing device for generating, in response to the transition trigger, a content transition that specifies an exception to the content schedule; and means implemented by at least one computing device for modifying content output by applying the content transition to perform one or more of:

inserting an instance of supplemental content after the instance of primary content instead of a further instance of primary content specified by the content schedule; or modifying a default output duration for the instance of primary content specified by the content schedule.

19. The system as described in claim 18, wherein said modifying the output duration for the instance of primary content comprises extending the output duration by inserting additional related content into the instance of primary content.

20. The system as described in claim 18, wherein the sensor data indicates a human behavior and demographic data associated with the human behavior, the system further comprising:

means for searching a set of supplemental content with the demographic data to correlate the instance of supplemental content with the demographic data.

\* \* \* \* \*